United States Patent [19]
Bonaffini et al.

[11] Patent Number: 5,596,331
[45] Date of Patent: Jan. 21, 1997

[54] REAL-TIME CONTROL SEQUENCER WITH STATE MATRIX LOGIC

[75] Inventors: Andrew M. Bonaffini; Kathleen F. Bonaffini, both of Warrenton; Michael J. Buehler; Hubert A. Miller, both of Manassas; Galen Plunkett, Jr., Burke; Sidney F. Rudolph, Warrenton; Michael A. Sweeney, Manassas, all of Va.; Donald E. Wallis, Marblehead, Mass.

[73] Assignee: Lockheed Martin Corporation, Bethesda, Md.

[21] Appl. No.: 193,720

[22] Filed: May 13, 1988

[51] Int. Cl.$^6$ .............................. G01S 3/02; G05B 15/00
[52] U.S. Cl. .......................... 342/455; 364/136; 364/140
[58] Field of Search ..................................... 364/140, 141, 364/200, 400, 136; 342/455

[56] References Cited

U.S. PATENT DOCUMENTS

| | | | |
|---|---|---|---|
| 3,943,297 | 3/1976 | Pommerening et al. | 379/290 |
| 4,253,188 | 2/1981 | Gable | 375/116 |
| 4,415,969 | 11/1983 | Bayliss et al. | 364/200 |
| 4,447,876 | 5/1984 | Moore | 364/200 |
| 4,471,426 | 9/1984 | McDonough | 364/200 |
| 4,471,483 | 9/1984 | Chamberlain | 371/21 |
| 4,473,880 | 9/1984 | Budde et al. | 364/200 |
| 4,503,534 | 3/1985 | Budde et al. | 364/200 |
| 4,538,239 | 8/1985 | Magar | 364/754 |
| 4,591,972 | 5/1986 | Guyer et al. | 364/200 |
| 4,631,666 | 12/1986 | Harris et al. | 364/200 |
| 4,635,277 | 1/1987 | Blake et al. | 375/20 |
| 4,639,921 | 1/1987 | Gang et al. | 364/900 |
| 4,658,253 | 4/1987 | Johnson | 340/825.83 |
| 4,674,089 | 6/1987 | Poret et al. | 364/200 |
| 4,677,586 | 6/1987 | Magar et al. | 364/900 |

*Primary Examiner*—Salvatore Cangialosi
*Attorney, Agent, or Firm*—John E. Hoel; Mark A. Wurm

[57] ABSTRACT

A high performance, real-time control sequencer is disclosed which incorporates a unique state matrix logic. This real-time control sequencer performs rapid resolution of control processed state transitions and the required control actions as a function of detected external events and the current control process state. The control sequencer's micro-instructions present event and current state data as inputs to a state matrix logic and initiate state matrix operations. The state matrix, in turn, outputs data defining and initiating the next control process state, required process control actions to be performed by the control sequencer microcode, process status, and event response or control output data. The real-time, event-driven data processor invention provides greater flexibility for reconfiguring event patterns to be detected and responses desired. It provides for a faster resolution of control process state transitions and the required control actions, and it accomplishes this with a larger repertoire of event patterns and responses stored in a smaller memory area, than has been required in the prior art.

20 Claims, 24 Drawing Sheets

FIG. 4

| WORD NO. | *WORD INDEX (BIN.) | WORD PARAMETERS / BIT POSITIONS |||||||||||||||| 
|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| 1 | 000000 | CURRENT STATE VECTOR (* AND **) |||||||| - XX - ( RESERVED FOR BIA USE ) ||||||||
| 2 | 000001 | - XX - ( RESERVED FOR BIA USE ) |||||||| BUS CONTEND QUEUE PURGE CODE ** ||||||||
| 3 | 000010 | TIME OUT COUNTER ** ||||||||||||||||
| 4 | 000011 | ( RESERVED FOR BIA USE ) ||||||||||||||||
| 5 | 000100 | ( RESERVED FOR NOS USE ) |||||||| - 0 - |||| BIA CMD CODE * ||||
| 6 | 000101 | ( RESERVED FOR NOS USE ) ||||||||||||||| TB |
| 7 | 000110 | COMMAND RESPONSE STATUS CODE ** |||||||| - XX - ||||||||
| 8 | 000111 | ASSOCIATED LPI ADDRESS ** ||||||||||||||||
| 9 | 001000 | LPI MEMORY ENTRY WORD ** ||||||||||||||||
| 10 | 001001 | TRANSACTION STEP TIME OUT VALUE ||||||||||||||||
| 11 | 001010 | - 0 - |||||||| RECEIVED FRAME ACK/ECC CODE ** ||||||||
| 12 | 001011 | DQ BUFFER ADDRESS ** ||||||||||||||||
| 13 | 001100 | SEND/RECEIVE DATA SUB-PACKET COUNT ** ||||||||||||||||
| 14 | 001101 | RESPONSE/CALL ** TASK ID |||||||| RESPONSE/CALL ** PRIORITY ||||||||
| 15 | 001110 | ( RESERVED FOR NOS USE ) ||||||||||||||||
| 16 | 001111 | ( RESERVED FOR NOS USE ) ||||||||||||||||

* = PARAMETERS ACCESSED DURING STATE MATRIX LOGIC INPUT OPERATIONS
** = PARAMETERS ACCESSED OR WRITTEN DURING STATE MATRIX LOGIC OUTPUT AND ACTION CODE OPERATIONS.

FIG. 5

NULL FRAME

| SYNC | FRAME ACK/ECC | BUS CONTEND |
|---|---|---|

TOKEN FRAME

| SYNC | FRAME ACK/ECC | BUS CONTEND | FRAME CTRL FIELDS |
|---|---|---|---|

SIGNAL FRAME

| SYNC | FRAME ACK/ECC | BUS CONTEND | FRAME CTRL FIELDS | SIGNAL DATA (16 BYTES) |
|---|---|---|---|---|

BAL FRAME

| SYNC | FRAME ACK/ECC | BUS CONTEND | FRAME CTRL FIELDS | DATA PACKET (VARIABLE SIZE 128 TO 2K BYTES IN 128 BYTE INCREMENTS) |
|---|---|---|---|---|

| RECEIVE ACK/ECC EVENT | BIA COMMAND EVENT | RECEIVE FR CTRL EVENT | RECEIVE FR DATA EVENT |
|---|---|---|---|

*FIG. 6*

| THREE BIT ACK CODE | INTERPRETATION |
|---|---|
| 000 | NULL |
| 001 | GOOD |
| 010 | BUSY |
| 011 | REPEAT / ERROR DETECTED ( RED ) |
| 100 | SEQUENCE ERROR ( SEQE ) |
| 101 | LPI EXCEPTION |
| 110 | UNIT EXCEPTION |
| 111 | ( INVALID / RESERVED CODE ) |

FIG. 7

| WORD | WORD PARAMETERS / BIT POSITIONS | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 1 | NOS FLAGS ||||||||  FRAME TYPE CODE (FTC) |||| FRAME TYPE MODIFIER (FTM) ||||
| 2 | FRAME DIRECTED VIA LPI ||||||||||||||||
| 3 | FRAME DIRECTED TARGET LPI ||||||||||||||||
| 4 | 0 | 0 | 0 | 0 | 0 | 0 | 0 | 0 | 0 | 0 | SUB-PACKET COUNT (BAL FR) ||||||
| 5 | FRAME CONTROL SIGNATURE ||||||||||||||||

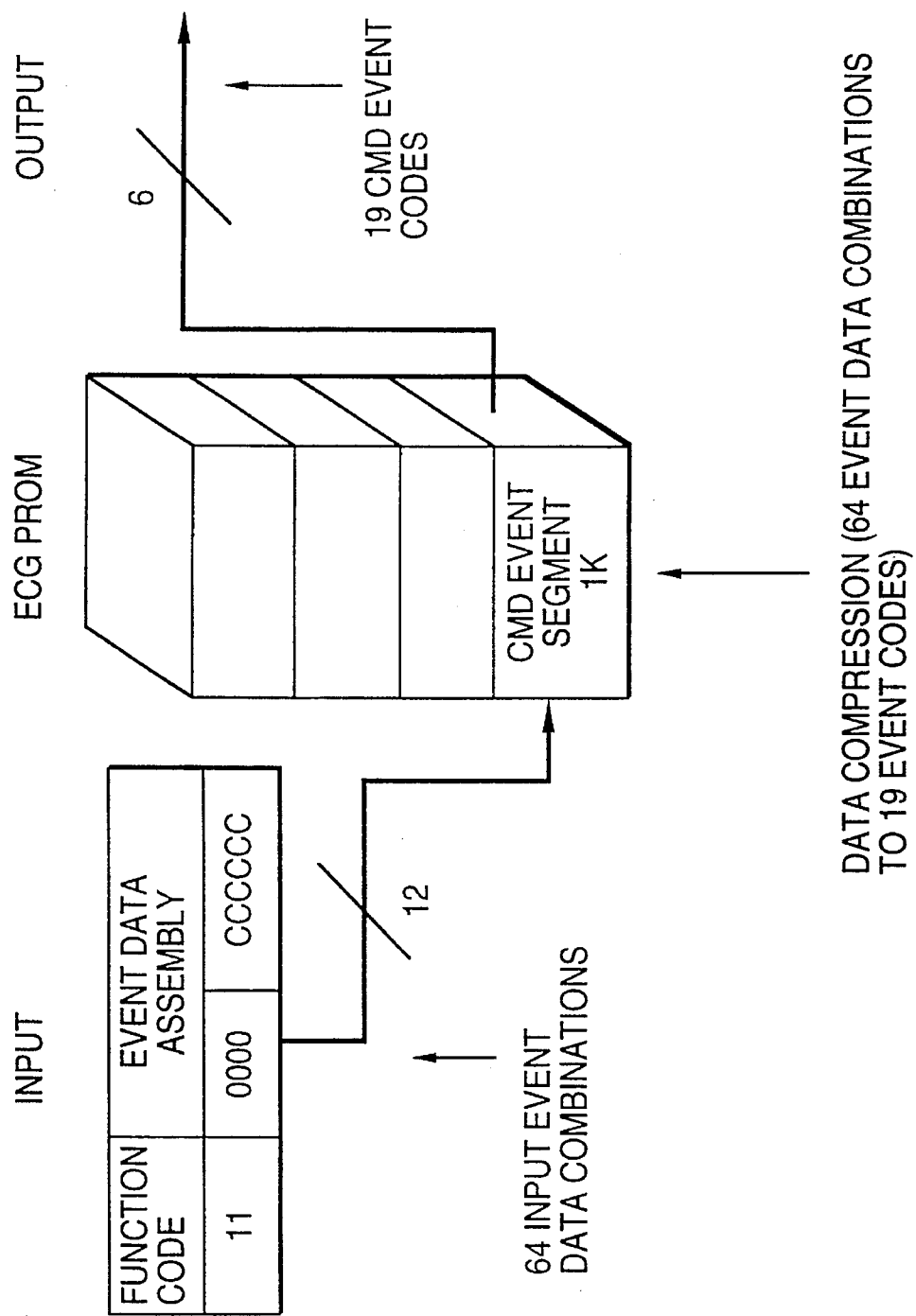

FIG. 11A

| FILEID: | REV: | TYPE: | DATE: |
|---|---|---|---|
| IBM CORPORATION, MANASSAS, VA. | | PROGRAMMER: | |
| STATE = | | | |

| EVENT CODE (HEX) | EVENT MNEMOMIC | STATE MATRIX EVENT ENTRY / OUTPUTS | | | |
|---|---|---|---|---|---|
| | | NEXT STATE | STATUS | ACTION | ACK OUT |
| 00 | GOOD_ACK | | | | |
| 01 | RED_ACK | — RECEIVE FRAME ACKNOWLEDGE CODE EVENTS | | | |
| 02 | NULL_ACK | | | | |
| 03 | BAD_ACK | | | | |
| 04 | INVALID EVENT_A | — UNUSED (RESERVE) EVENT CODES | | | |
| 05 | INVALID EVENT_B | | | | |
| 06 | TOKEN | | | | |
| 07 | APERIODIC_BAL | | | | |
| 08 | PERIODIC_BAL | | | | |
| 09 | SIG_&_CELLAVAIL | | | | |
| 0A | SIGNAL_&_NOCELL | | | | |
| 0B | BCSIG_&_CELLAV | | | | |
| 0C | BC_SIG_&_NOCELL | — RECEIVE FRAME CONTROL FIELDS EVENTS | | | |
| 0D | IMMED_RESET_CMD | | | | |
| 0E | IMMED_HIO_CELAV | | | | |
| 0F | IMMED_HIO_NOCEL | | | | |
| 10 | IMMED_FXR_CELAV | | | | |
| 11 | IMMED_FXR_NOCEL | | | | |
| 12 | PURGE_&_CELLAV | | | | |
| 13 | PURGE_&_NOCELL | | | | |

FIG. 11B

| EVENT CODE (HEX) | EVENT MNEMOMIC | STATE MATRIX EVENT ENTRY / OUTPUTS | | | |
|---|---|---|---|---|---|
| | | NEXT STATE | STATUS | ACTION | ACK OUT |
| 14 | IMMED_RDSEN_CMD | | | | |
| 15 | IMMED_PM/FL_CMD | | | | |
| 16 | IMMED_RDMF_CMD | | RECEIVE FRAME CONTROL FIELDS EVENTS (CONTINUED) | | | |
| 17 | IMMED_T/SMF_CMD | | | | |
| 18 | IMMED_MMF_CMD | | | | |
| 19 | INVALID_FR_CTRL | | | | |
| 1A | BC_BAL_&_CELLAV | | | | |
| 1B | BC_BAL_&_NOCEL | | | | |
| 1C | INVALID_EVENT_E | ← UNUSED (RESERVE) EVENT CODES | | | |
| 1D | DISABLE_CMD | | | | |
| 1E | MONITOR_SIGS_CMD | | | | |
| 1F | XMIT_SIGS_CMD | | | | |
| 20 | EXCHANGE_SIGS_CMD | | | | |
| 21 | XMIT_BC_SIG_CMD | | | | |
| 22 | XMIT_HIO_CMD | | | | |
| 23 | XMIT_RD_MGRF_CMD | | I / O PORT COMMAND EVENTS | | |
| 24 | XMIT_T/S_MGRF_CMD | | | | |
| 25 | XMIT_MT_MGRF_CMD | | | | |
| 26 | RECEIVE_SIG_CMD | | | | |
| 27 | START_MSG_CMD | | | | |
| 28 | XMIT_DATA_CMD | | | | |
| 29 | RECEIVE_DATA_CMD | | | | |
| 2A | INVALID_CMD | | | | |
| 2B | MONITOR_BCDATA_CMD | | | | |

FIG. 11C

| EVENT CODE (HEX) | EVENT MNEMONIC | STATE MATRIX EVENT ENTRY / OUTPUTS | | | |
|---|---|---|---|---|---|
| | | NEXT STATE | STATUS | ACTION | ACK OUT |
| 2C | XMIT_BCDATA_CMD | | | | |
| 2D | XMIT_BCDAT/MON_CMD | | | | |
| 2E | EXCH_BCDAT/SIG_CMD | I/O PORT COMMAND EVENTS (CONTINUED) | | | |
| 2F | XMIT_BCSIG/MON_CMD | | | | |
| 30 | EXCH_BC_SIGS_CMD | | | | |
| 31 | XMIT_DATA_STRT_CMD | | | | |
| 32 | XMIT_DATA_MON_CMD | | | | |
| 33 | INVALID_EVENT_N | | | | |
| 34 | INVALID_EVENT_O | | | | |
| 35 | INVALID_EVENT_P | UNUSED (RESERVE) EVENT CODE | | | |
| 36 | INVALID_EVENT_Q | | | | |
| 37 | INVALID_EVENT_R | | | | |
| 38 | TIME_OUT | (I/O PORT CMD PROCESSING EVENT) | | | |
| 39 | REC_DATA_GOOD | RECEIVE FRAME DATA EVENTS | | | |
| 3A | REC_DATA_BAD | | | | |
| 3B | INVAL_ECG_LOCATION | INVALID ECG PROM LOCATION CODE | | | |
| 3C | INVALID_EVENT_S | | | | |
| 3D | INVALID_EVENT_T | UNUSED (RESERVE) EVENT CODE | | | |
| 3E | INVALID_EVENT_U | | | | |
| 3F | INVALID_EVENT_V | | | | |

FIG. 18
STATE BLOCK INTERNAL LINE INFORMATION
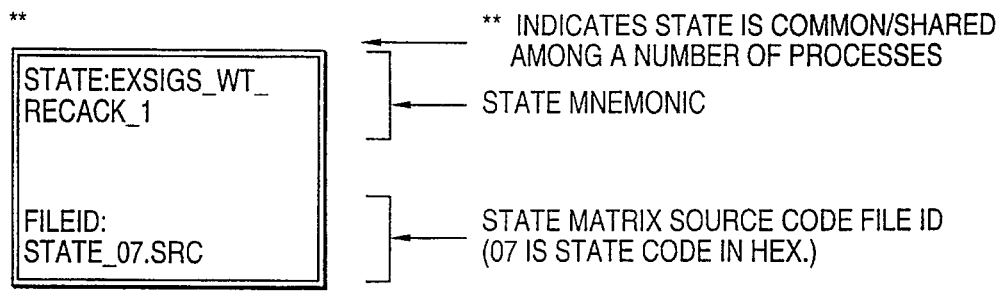
STATE BOXES AND EVENT/TRANSITION LINES
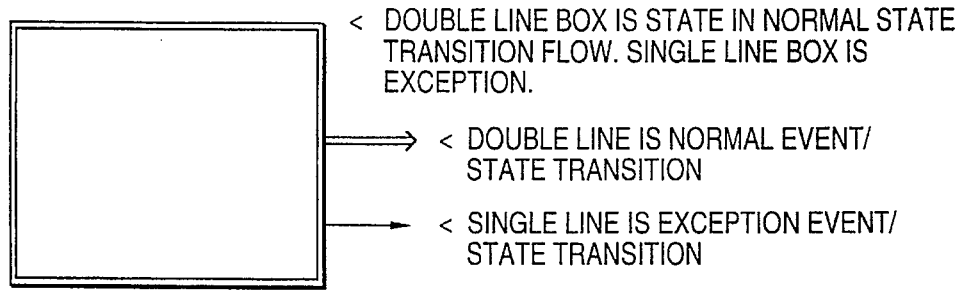
STATE MNEMONICS (TYPICAL)
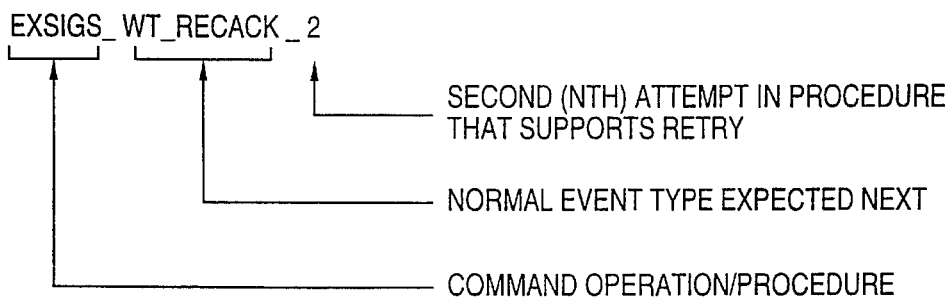

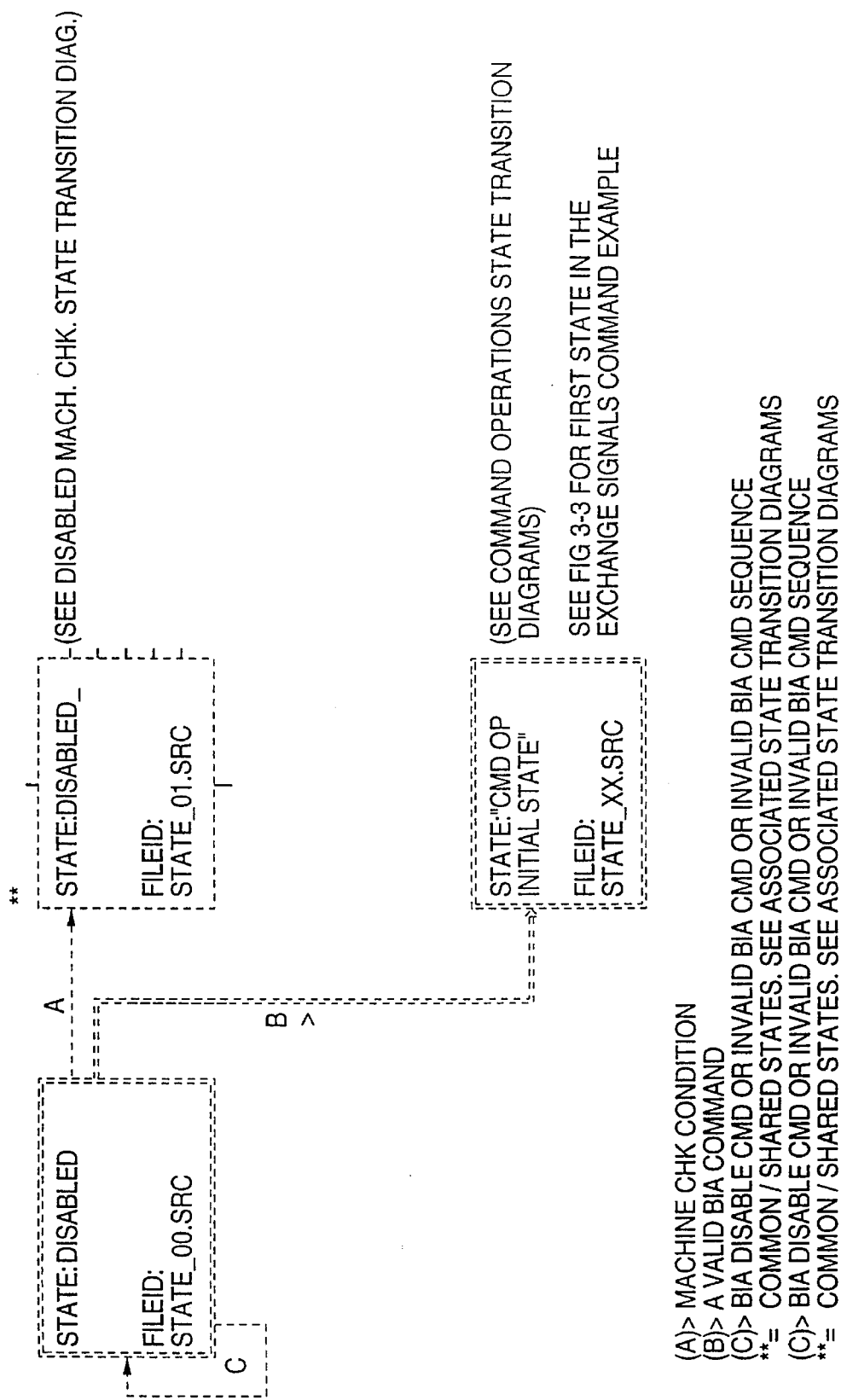

FIG. 20

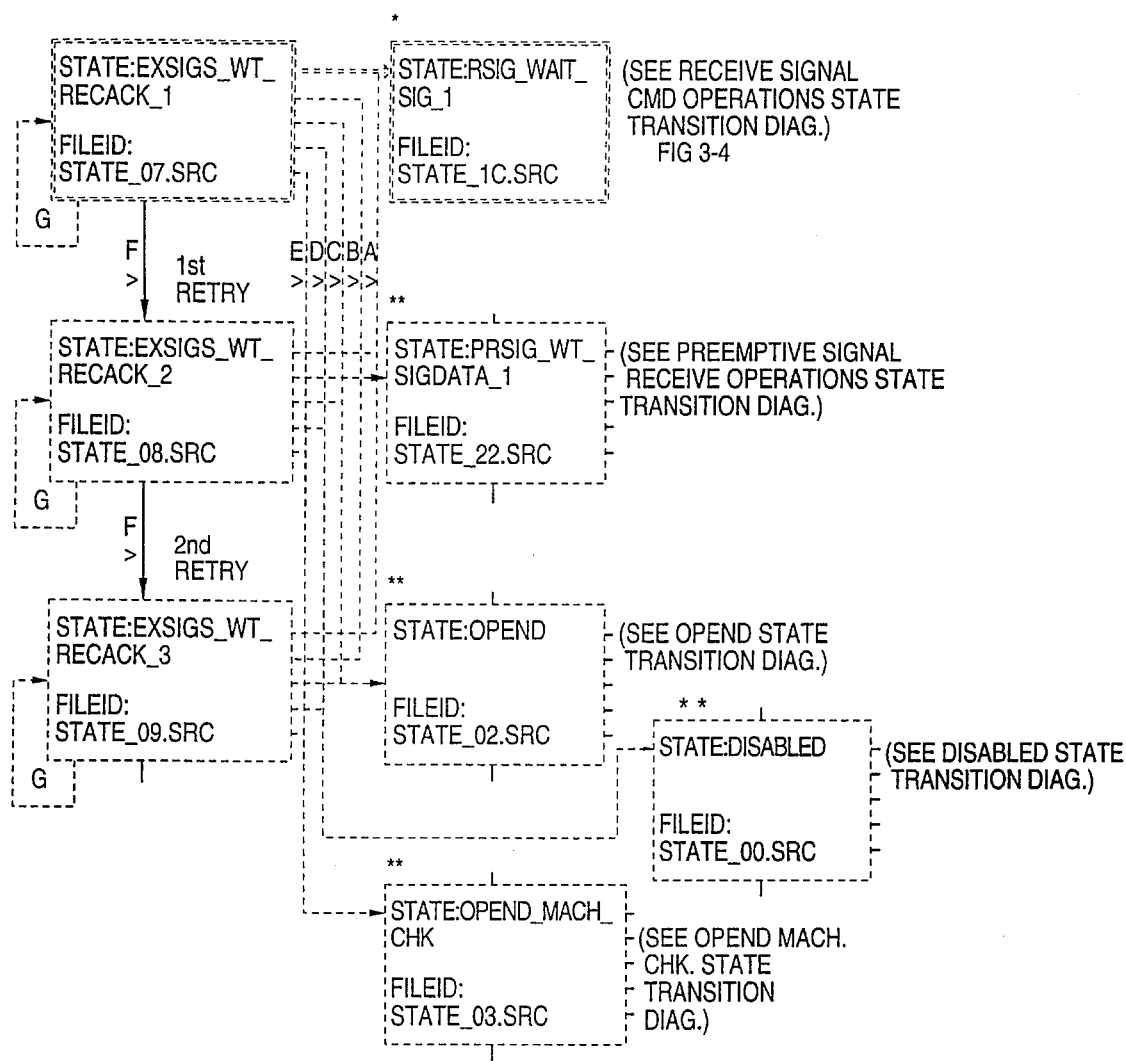

(A)> GOOD ACK RECEIVED
(B)> PREEMPTIVE SIGNAL FRAME CTRL RECEIVED
(C)> TIME OUT, BIA CMD (PC CONDITION), BAD ACK RECEIVED, RED ACK OR NULL ACK
      RECEIVED IN THE CASE OF EXSIGS_WT_RECACK_3
(D)> IMMEDIATE PURGE CMD SIGNAL RECEIVED
(E)> MACHINE CHECK CONDITION
(F)> RED ACK OR NULL ACK RECEIVED
(G)> FRAME CTRL RECEIVED AND REJECTED WITH SEQE, LPI EXCEPT., OR NULL ACKOUT
**= COMMON / SHARED STATES. SEE ASSOCIATED STATE TRANSITION DIAGRAMS

FIG. 21

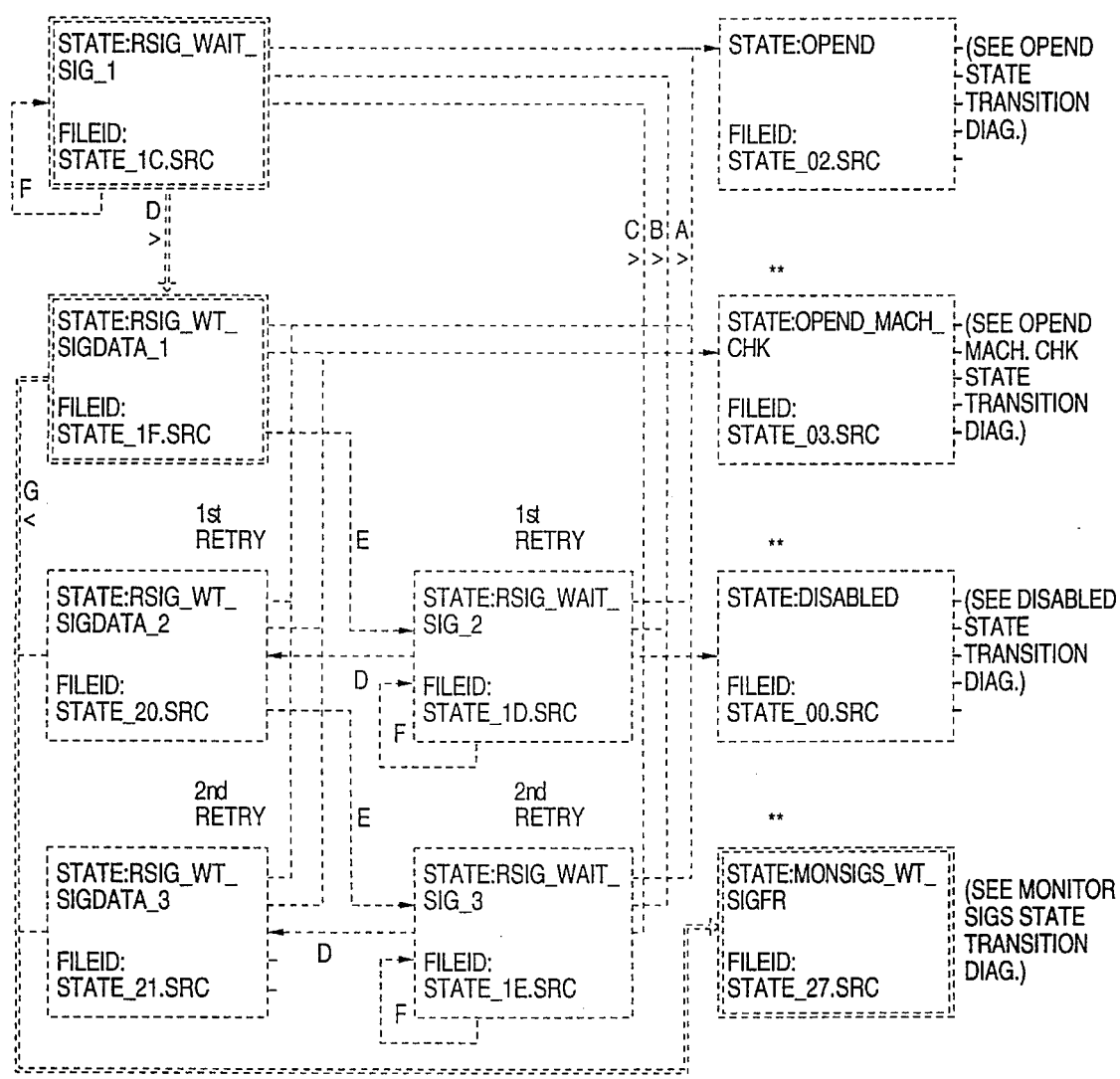

(A)> TIMEOUT, PROTOCOL EXCEPTION FRAME CTRL RECEIVED (WAITING ON SIG.),
   BIA CMD (WAITING SIG.), DATA BAD (WAITING ON DATA_3)
(B)> MACHINE CHECK CONDITION
(C)> IMMEDIATE PURGE CMD SIGNAL FRAME CTRL
(D)> VALID SIG FRAME CTRL RECEIVED
(E)> RECEIVED BAD SIG DATA
(F)> INVALID SIG FRAME CTRL REJECTED WITH LPI EXCEPTION OR NULL ACKOUT
(G)> SIG DATA GOOD
** COMMON/SHARED STATES. SEE ASSOCIATED STATE TRANSITION DIAGRAMS.

FIG. 22

| RESOURCE | AVAILABLE | USED | RESERVE |
|---|---|---|---|
| STATE MATRICIES | 256 | 73 (30%) | 183 (70%) |
| EVENT CODES | 64 | 48 (75%) | 16 (25%) |
| ACTION CODES | 256 | 51 (20%) | 205 (80%) |
| STATUS CODES | 256 | 37 (15%) | 219 (85%) |

REAL-TIME CONTROL SEQUENCER WITH STATE MATRIX LOGIC

BACKGROUND OF THE INVENTION

1. Technical Field

The invention disclosed broadly relates to data processing and, more particularly, relates to real-time, event-driven data processing.

2. Background Art

Applications in real-time, event-driven data processing occur in industrial process control, communications switching, distributed data processing, internal combustion engine control, collision detection and avoidance, and many other areas. These applications have in common the detection of events in real-time and the computation of responses to patterns of events by means of a stored program data processor. A real-time, event-driven data processor will have a plurality of stored programs, each of which is comprised of a sequence of instructions which enable the classification of patterns of events which occur and which provide for predetermined responses. This requires sequencing through an appropriate series of program instructions to carry out the desired response. An example of such a real-time, event-driven data processor would be a telephone call processor in a private branch exchange, which detects requests for service and responds with appropriate call establishment operations.

The problem with the typical prior art real-time, event-driven data processor is the lack of flexibility in enabling the system manager to alter patterns of events to be monitored and the responsive sequences of instructions to be performed. In process control applications, problems have been encountered in the performance of a rapid resolution of control process state transitions. Still further, in order to provide for an adequate repertoire of event patterns and desired response sequences, large quantities of the data need to be stored in association with the data processor.

OBJECTS OF THE INVENTION

It is therefore an object of the invention to provide an improved real-time, event-driven data processor.

It is another object of the invention to provide an improved real-time, event-driven data processor which is more flexible in allowing reconfiguration of event patterns and desired responses than has been available in the prior art.

It is still a further object of the invention to provide an improved real-time, event-driven data processor which performs a more rapid resolution of control process state transitions and required control actions, than has been available in the prior art.

It is still a further object of the invention to provide an improved real-time, event-driven data processor which is capable of storing a large repertoire of event patterns and desired responses, with a smaller memory allocation than has been required in the prior art.

SUMMARY OF THE INVENTION

These and other objects, features and advantages are accomplished by the invention disclosed herein. A high performance, real-time control sequencer is disclosed which incorporates a unique state matrix logic. This real-time control sequencer performs rapid resolution of control process state transitions and the required control actions as a function of detected external events and the current control process state. The control sequencer's micro-instructions present event and current state data as inputs to a state matrix logic and initiate state matrix operations. The state matrix, in turn, outputs data defining and initiating the next control process state, required process control actions to be performed by the control sequencer microcode, process status, and event response or control output data. The real-time, event-driven data processor invention provides greater flexibility for reconfiguring event patterns to be detected and responses desired. It provides for a faster resolution of control process state transitions and the required control actions, and it accomplishes this with a larger repertoire of event patterns and responses stored in a smaller memory area, than has been required in the prior art.

A significant aspect of this invention is the drastic reduction in implementation and design complexity that it affords. Application control problems can be defined in a high level tabular format which is essentially self documenting and easily reviewed and maintained. Since the control function is never required to be manually translated into specific software, microcode or hardware, the invention enables changes, updates and fixes to the application function to be easily implemented. This invention facilitates a natural separation of implementing mechanism from control function. Such things as transmitting control frames, receiving data, storing data, updating state tables, etc., are implemented as separate stand alone operations, independent of ultimate use in the overall control sequence. This invention allows a set of generalized control mechanisms to be specified and implemented independently of the design of the overall control system application. The design of real time control systems has traditionally been one of the most difficult and time-consuming problems in computer science. This invention has shown dramatic improvements in the overall development time and reduction in error rates in these types of problems.

DESCRIPTION OF THE FIGURES

These and other objects, features and advantages of the invention will be more fully appreciated with reference to the accompanying figures.

FIG. 4 shows the Port Control Block (PCB) command and control segment format.

FIG. 5 illustrates the Real-Time Communication Network (RTCN), bus frame types.

FIG. 6 illustrates the frame acknowledge codes.

FIG. 7 illustrates the RTCN bus frame control fields.

FIG. 10 illustrates the general partitioning and coding of the Event Code Generator (ECG), PROM for I/O port command event processing.

FIG. 11 is divided into FIGS. 11a, 11b and 11c, and illustrates the state matrix coding template.

FIG. 18 is the key to the high level state transition diagrams.

FIG. 19 is a state transition diagram for a disabled state.

FIG. 20 is a state transition diagram for the exchange signals command operations.

FIG. 21 is a state transition diagram for receive signal command subroutine.

FIG. 22 consists of three pages of FIGS. 22a, 22b and 22c, which show the state matrix PROM source code for the disabled state.

FIG. 23, which consists of three FIGS. 23a, 23b and 23c, illustrates the state matrix PROM source code for the EXSIGS-WT-RECACK-1 state.

FIG. 24, which consists of three FIGS. 24a, 24b and 24c, illustrates the state matrix PROM source code for the RSIG-WAIT-SIG-1 state.

FIG. 25, which consists of three FIGS. 25a, 25b and 25c, shows the state matrix PROM source code for the RSIG-WT-SIGDATA-1 state.

FIG. 26 is a summary of state matrix logic resource utilization and the implementation of the RTCN NIU BIA application.

Figure 1:
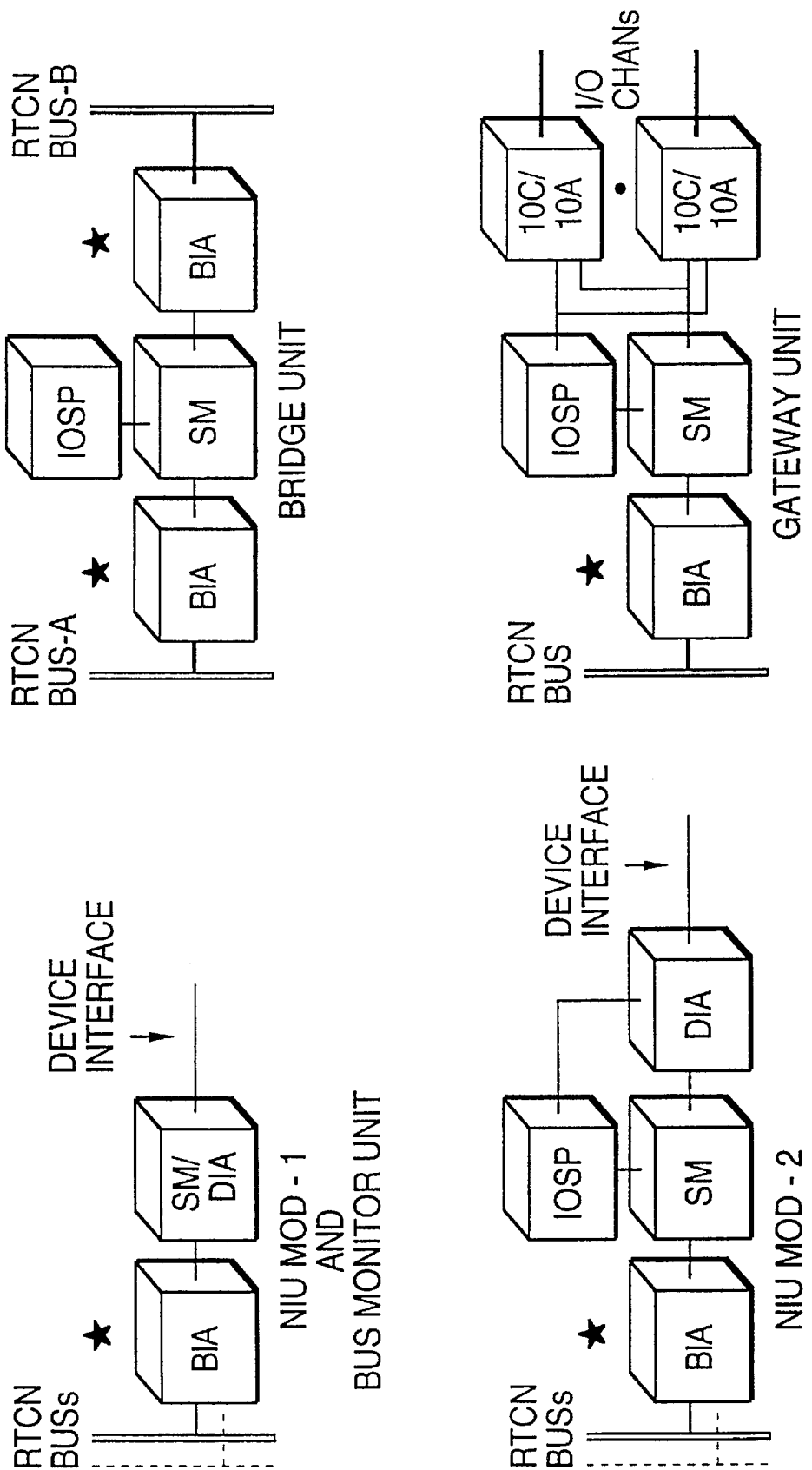
FIG. 1 illustrates four different applications of a Bus Interface Adapter (BIA), which includes the invention.

DISCUSSION OF THE PREFERRED EMBODIMENT 1.1 Purpose

Disclosed is a high-performance real-time control sequencer which incorporates unique state matrix logic. This real-time control sequencer performs rapid resolution of control process state transitions and required control actions as a function of detected external events and current control process state. The control sequencer's micro instructions present event and current state data as inputs to the state matrix logic and initiate state matrix operations. The state matrix, in turn, outputs data defining and initiating next control process state, required process control actions to be performed by control sequencer micro code, process status, and event response or control output data.

It is quite common to provide rigorous definition and specification of control processes in the form of state transition diagrams and or state matrices/tables defining, for each possible input or event detected, the next state to transition to and the required control actions and outputs. When implementing this control process specification in conventional micro controllers/sequencers, the compact and direct state matrix specification must be transformed to sequential code in the form of lengthy branch trees corresponding to all combinations of current state and possible event. In the control sequencer incorporating state matrix logic, which is described in this document, the control process is coded and loaded directly in the intrinsic state matrix format and the control sequencer operates directly on same.

An inspection of the state matrix code is an inspection of the actual implemented control process.

The purpose of this document is to describe the operations of the state matrix logic for the application in the Bus Interface Adapter (BIA) module associated with the implementation of a high-performance fiber optic Real-Time Communications Network (RTCN). The general design, concepts, and approach described and embodied here may be applied to a broad range of control sequencer applications with similar benefits.

1.2 Scope

The organization, content, and scope of this document is as follows.

The remainder of this section defines the RTCN application example. The RTCN Network Interface Unit's hardware/machine-level functional module configuration is defined. Two of these modules, which are associated with any description of the state matrix logic are defined. These modules are the BIA, which contains both the control sequencer and the state matrix logic, and the Shared Memory (SM) module, which provides some ancillary control block memory and queue resources. This RTCN state matrix logic implementation of the application control process is compared with a prior art implementation using three conventional control sequencers. This prior art implementation example is from the Distributed System Data Bus (DSDB), described in U.S. Pat. No. 4,373,183 to Means, et al., entitled "Bus Interface Units Sharing a Common Bus Using Distributed Control for Allocation of the Bus," assigned to IBM Corporation. RTCN is a architectural evolution and cost/performance enhancement of the DSDB.

Section two defines the general state matrix logic operations for the control process application example. It covers the operations associated with the four general event type inputs to the state matrix logic.

In section three a portion of actual state matrix coding for the application example and its operations are described. This example covers the initiation and execution of one of the BIA I/O port commands.

Section four summarizes the results of the application example.

1.3 Related Patent

U.S. Pat. No. 4,373,183 to Means, et al., entitled "Bus Interface Units Sharing a Common Bus Using Distributed Control for Allocation of the Bus," assigned to IBM Corporation.

1.4 Application in the Real-Time Communications Network (RTCN) Bus Interface Adapter (BIA) Module A design of a high-performance real-time control sequencer incorporating state matrix logic was used in the design and development of the Real Time Communications Network (RTCN). RTCN is a high-performance fiber optic local area communications network capable of supporting complex real-time application requirements.

Four common hardware functional modules were developed from which a variety of Network Interface Units, a Bridge Unit, Gateway Units, and a Bus Monitor Unit could be configured. The common hardware functional module set includes a Bus Interface Adapter (BIA) module, a Shared Memory (SM) module, an I/O Service Processor (IOSP) module, and a Device Interface Adapter (DIA) Module. Some of the RTCN unit configurations derived from this common hardware functional module set are shown in FIG. 1. A design of a control sequencer incorporating state matrix logic was used in the key BIA module. One or more BIA are used in all RTCN unit configurations. Prototypes of the MOD1-NIU, MOD2-NIU, and BMU were designed in a variety of RTCN network configurations. A description of BIA control sequencer/state matrix operations also involves some memory and queue resources partitioned on the SM module. An overview of the BIA and SM modules follows.

1.4.1 Bus Interface Adapter (BIA) Module 1.4.1.1 Role and Functions of The BIA

The BIA provides the interface to the fiber optic bus/communications media. It provides the link-level control associated with the reception and transmission of bus control and data frames. It provides a command and response interface to network management and control functions, above the media and link-level which reside in the IOSP module.

1.4.1.2 Block Diagram and Machine-Level Overview

Figure 2:
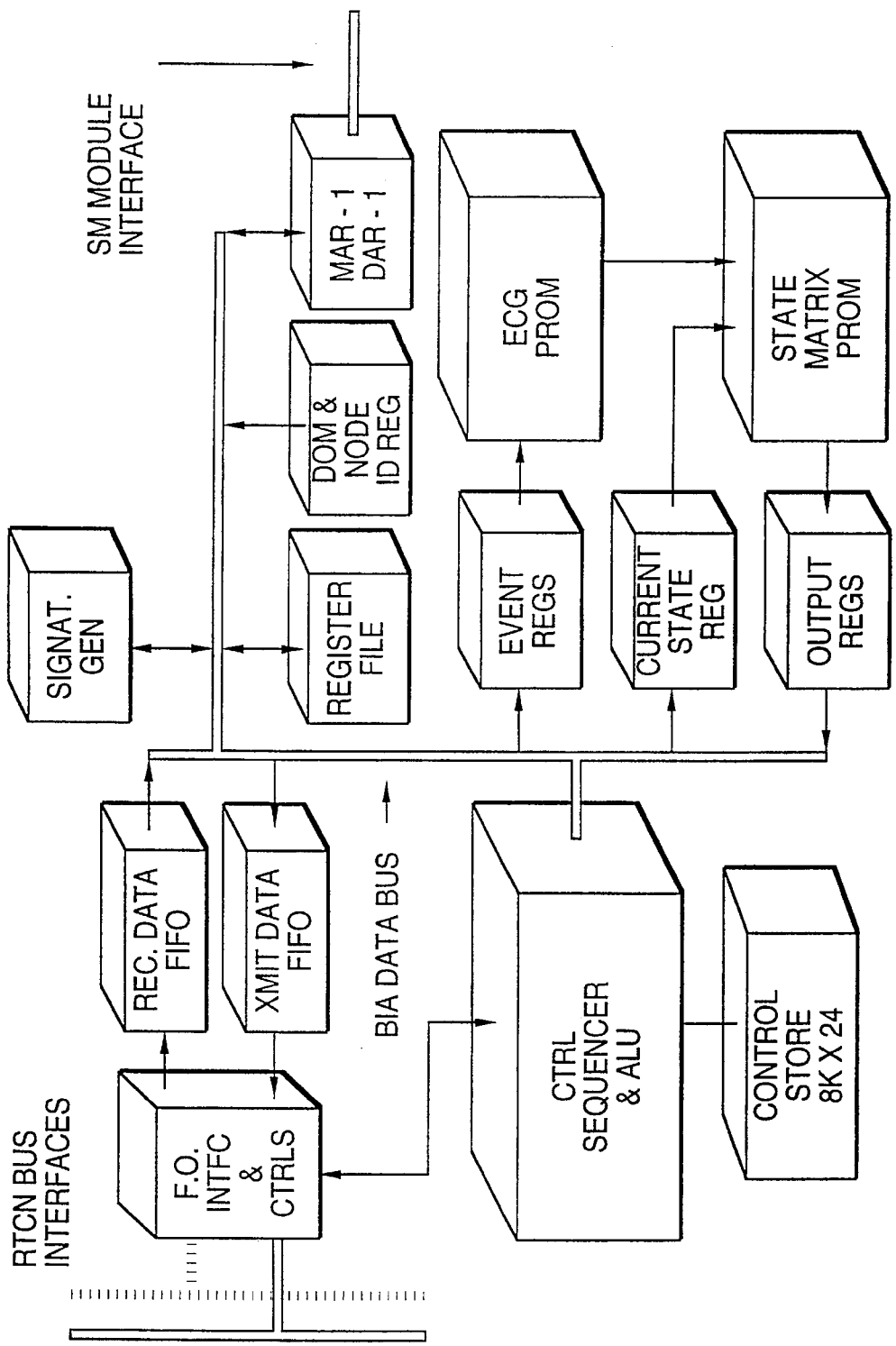
FIG. 2 is a functional block diagram of the Bus Interface Adapter module, in accordance with the invention.

FIG. 2 is a functional block diagram of the RTCN BIA module. A brief description of the resources partitioned on this module follows.

1.4.1.2.1 Fiber Optic Interface

The fiber optic interface logic provides the transmitter and receiver, encoding/decoding, and clock logic for the fiber optic transmission media interface. Dual transmitter and receiver logic is provided for reliability/availability. The BIA can switch to one or the other transmitter/receiver sets. The fiber optic interface logic is controlled by signals generated by the BIA Control Sequencer.

1.4.1.2.2 Bus Receive Data and Transmit Data FIFOs

These First In/First Out (FIFO) data buffers buffer data currently being received from the bus or being transmitted to the bus respectively. The BIA control sequencer/state matrix code controls data transfers between these data FIFOs and either Data Queue Buffers (DQ), Port Control Blocks (PCB), or Event Cells in the SM module, depending upon the frame type, frame field, and commanded BIA operation.

1.4.1.2.3 Signature Generator Logic

This logic performs a "CRC—16 Polynomial Division Algorithm" upon which all RTCN Bus data error detection is based. When data is received it is routed to this logic and a signature is computed which is compared with a received signature appended to the data. On transmit operations data is routed to this logic and a signature is computed which is appended to the transmitted data.

1.4.1.2.4 Control Sequencer and ALU

Micro code executing in the control sequencer, in consort with unique state matrix control logic, controls all BIA operations. Sequencer microcode performs all frame cycle synch. and transmit/receive operations in real-time. At various points during each frame cycle it presents either frame cycle or internal event data to state matrix control logic which resolves the event as a function of current port state and produces outputs which direct subsequent sequencer frame cycle control operations. These general state matrix operations are defined in section 2. The control sequencer architecture and micro instruction set uniquely supports the sequencers ability to input event and current state data to the state matrix logic, initiate state matrix operations, and be directed by state matrix outputs. The state matrix logics action code output is gated to the sequencers jump logic.

1.4.1.2.5 Control Store

An 8K by 16 bit PROM holds the BIA control sequencer microcode.

1.4.1.2.6 State Matrix Control Logic

At four specific points within each frame control cycle (see 1.4.3) the control sequencer may present event data to the state matrix control logic. The four event types are received frame ACK/ECC event, BIA port command or time-out event, received frame control fields event, and received frame data event. The raw event data is compressed down to a 6 bit event code by the state matrix Event Code Generator (ECG) PROM. Current port state (8 bits) is read from the associated port's Port Control Block (PCB) (from share memory within the SM/DIA module). Current port state and the event code are combined to form a State Matrix PROM address to access the specific event entry in the specific state matrix. The output of the State Matrix PROM directs subsequent control sequencer microcode frame cycle control operations for the current frame cycle. The State Matrix Prom outputs consist of next port state, action code, port status code, and frame ACK/ECC code. Next state output replaces the previously read current state in the port's PCB. The action code output tells the sequencer microcode how to proceed within the current frame cycle. The port status output may be stored in the PCB and a command response signal may be sent to the Network Operating System (NOS), which resides in the IOSP module, dependent upon the specific action code. The frame ACK/ECC code output may be Transmitted next frame cycle, again dependent upon the specific action code output.

1.4.1.2.7 Register File

Eight general purpose registers are provided for use by the control sequencer.

1.4.1.2.8 Memory Address and Data Registers

The Memory Address Register (MAR) and Memory Data Register (MDR) provide access to shared memory and memory mapped queues and registers on the SM module.

1.4.1.2.9 Bus Domain and Node ID Register

This register allows the sequencer microcode to access own bus domain and node ID information which is wired via the NIU's backpanel.

1.4.2 Shared Memory (SM) Module 1.4.2.1 Role and Functions

The SM module provides control and data buffer memory, priority and FIFO queue, and real-time clock resources which are shared with the IOSP module and DIA module. All of these elements except for the real-time clock are ancillary to general state matrix operations performed on the BIA module.

1.4.2.2 Block Diagram and Machine-Level Overview

Figure 3:
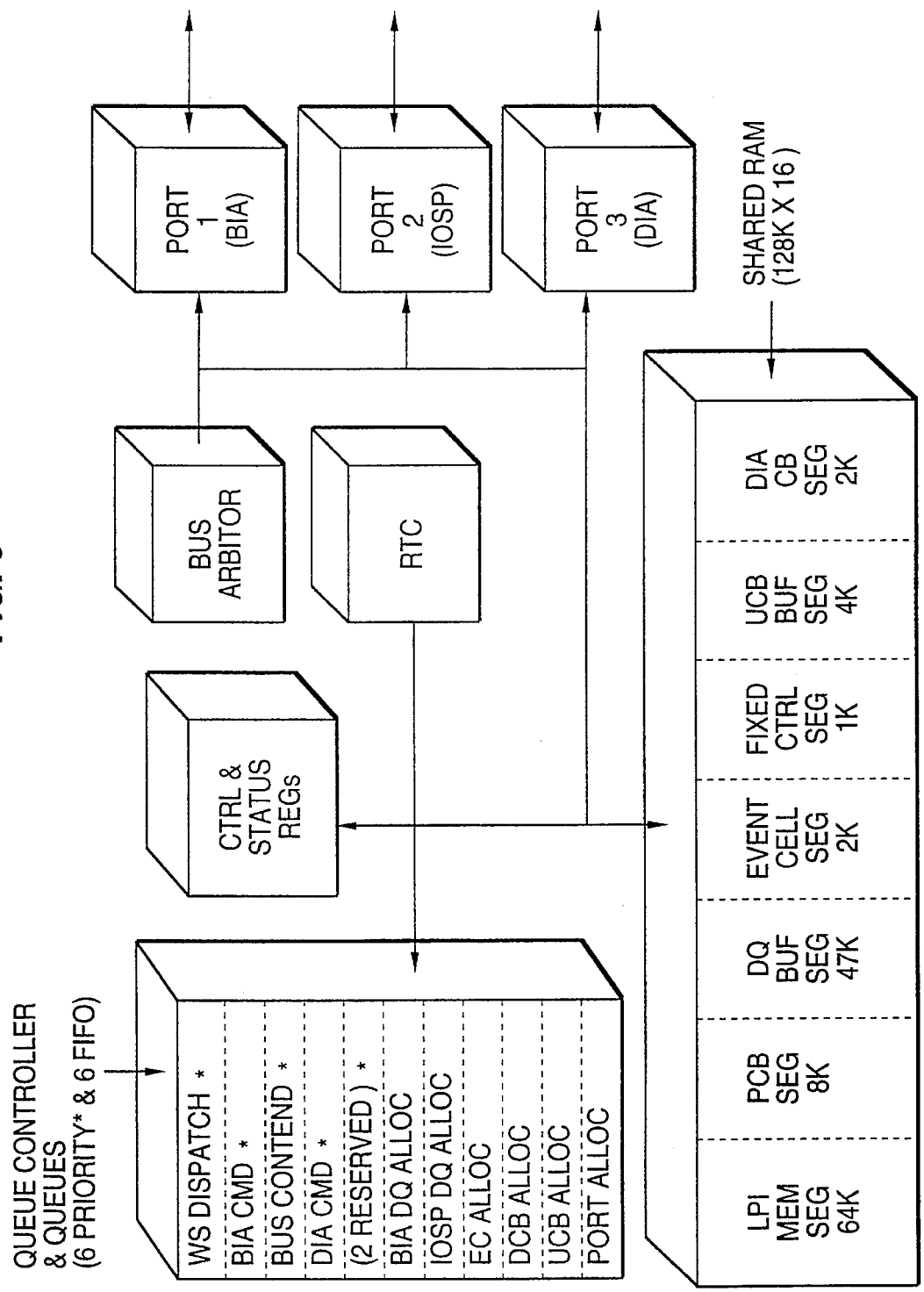
FIG. 3 is a functional block diagram of the Shared Memory (SM) module.

FIG. 3 is a functional block diagram of the SM module. A brief description of only those SM resources which are ancillary to general state matrix operations follows.

1.4.2.2.1 Bus Contend Queue

This hardware priority queue the port ID (Port Control Block (PCB) index) and priority of ports whose operations are waiting on the transmission of a frame. Only the BIA sequencer microcode may read or write this queue.

1.4.2.2.2 BIA Command Queue

This hardware priority queue contains the port ID (PCB index) and priority of ports with a pending port command from NOS. The BIA sequencer microcode may only read this queue which it does during BIA command event processing state matrix operations. NOS may only write this queue.

1.4.2.2.3 Work Step Dispatch Queue

This hardware priority queue contains the Port ID (PCB index), priority, and NOS work step ID of port command operations that have been completed by the BIA. This queue may only be written by the BIA, as directed by the state matrix logic output action code, and may only be read by NOS.

1.4.2.2.4 Event Cell Allocation Queue

This hardware FIFO queue contains the ID of available Event Cells (signal frame data buffers in SM) for use by the BIA microcode. The BIA sequencer microcode may either read or write this queue as directed by the state matrix logic's Output action code. NOS may only write this queue.

1.4.2.2.5 DQ Allocation Queue

This hardware FIFO queue contains the ID of available Data Queue (DQ) buffers for use by the BIA microcode for received broadcast data packets. The BIA sequencer microcode may either read or write this queue as directed by the state matrix logic's output action code. NOS may only write this queue.

1.4.2.2.6 Control Register

This register contains various NIU control bits. The BIA microcode and NOS may either read or write this register.

1.4.2.2.7 Status Register

This register contains a variety of NIU status conditions/bits. The BIA microcode and NOS may both only read this register.

1.4.2.2.8 Shared Control Memory (RAM)

The shared control memory contains 128K 16 bit words. It may be read or written by either the BIA microcode, the IOSP module, or the DIA module. It is divided into the following data buffer and control block segments:

1. LPI Memory Segment—This segment contains 64K words. Each word is associated with and controls the enabling or disabling of a virtual network address (e.g. Logical Path Identifier (LPI)). Each word contains enabled/disabled status and the index of the associated PCB. The BIA sequencer reads this segment during receive frame control event processing.

2. Port Control Block (PCB) Segment—This segment contains 8K words divided into 128 I/O Port Control Blocks with 64 words each. Each PCB is associated with the command and control of one of 128 concurrent I/O port operations initiated by NOS in the IOSP module. Each PCB is divided into four 16 word segments. These segments are the Command and Control Segment, the Receive Frame Buffer Segment, the First Frame Transmit Buffer Segment, and the Second Frame Transmit Buffer Segment. Current port state and port command code are held in the PCB Command and Control Segments and are accessed during state matrix logic operations. The next state and status code outputs from state matrix operations are written into the Command and Control segments by the control sequencer as directed by the state matrix logics output action code. The format of the PCB Command and Control Segments is shown in FIG. 4.

3. Data Queue (DQ) Buffer Segment—This segment contains 47K words divided into 47 DQ buffers with 1K words (2K bytes) each. Each DQ buffer holds a data packet received from the RTCN bus or waiting to be transmitted on the bus.

4. Event Cell Segment—This segment contains 2K words divided into 128 event cells with 16 words each. Event Cells are used to Buffer frames received on ports that are in a "Monitor" command state.

5. Fixed Control Segment—This segment contains 1008 words
of fixed control parameters.

6. User Command Block (UCB) and DIA Command Block Segments—These command and control block segments, containing 4K and 2K words respectively are used by the IOSP and DIA only.

1.4.3 RTCN Bus Frame Types and General Frame Cycle Time Line Processing

1.4.3.1 Frame types

As illustrated in FIG. 5, four types of frames are transmitted on the RTCN bus. These are Null Frames, Token Frames, Signal Frames, and BAL Frames and associated data packets.

Null Frame

RTCN nodes contend for frame slots on the bus when they have control information or data to transmit. A Null Frame occurs when no node contends for a given frame slot.

Token Frame

A node which is receiving data under a periodic message transaction protocol sends a Token Frame when it is ready to receive the next BAL Frame/data packet.

Signal Frame

Signal Frames are transmitted in the various message transaction level protocols to present message/transaction level command, control, and response information. They are also transmitted to perform a variety of network control functions.

BAL Frame/(Data Packet)

BAL Frames are used in the various message/transaction level protocols to send user I/O data. Each BAL Frame and associated data packet may transmit from 128 to 2k bytes of data and a single message/transaction may contain one or more BAL Frames/Data Packets.

1.4.3.2 Common Frame Cycle Segments/Fields

As shown in FIG. 5 the first three frame cycle segments/fields are common to and associated with all four frame types.

Frame Synchronization

For the start of each frame cycle the bus node which is the current Bus Synch Generator (BSG node) transmits a synchronization pattern and all other (listening) nodes attempt to establish synchronization.

Frame Acknowledgement

Following the establishment of frame synch, the node that received the previous frame (provided it was not sent in broadcast mode) transmits a frame acknowledge code (ACK/ECC). This is a seven bit error correcting code (three bit ACK code plus four ECC bits). This provides for single bit error correction and double and triple bit error detection. The frame acknowledge codes are shown in FIG. 6.

Bus Contention

Following the transmission of prior frame acknowledgement, all bus nodes, with information to transmit, will contend for the current frame interval. Each contending node concurrently transmits an eight bit priority code followed its six bit physical node ID ("Talk Address (TA)"). Transmission begins with the most significant priority bit. Following each bit transmission, each node receives the resulting "Dot ORed" bit. If the received bit does not match the bit transmitted by a node, it will drop out of the contention process. The node which receives a match on all fourteen bits is the contention winner. Note that the Talk address acts as a tie breaker if more then one node has the same highest priority. If no node contends for the current frame interval, it is declared a Null frame and the next frame interval is begun with frame synchronization.

Frame Control Fields

Following bus contention, the node winning contention will transmit frame control fields defining the frame and its path and target node addressing. The frame control fields, consisting of five 16 bit words, is shown in FIG. 7.

Frame Data

Following the transmission of the frame control fields, frame data is transmitted in both the signal and BAL frame cycles as follows.

Signal Data

Sixteen bytes (8 words) are of signal data are transmitted in each signal frame. This data is generally parameters associated with immediate network commands/command responses or NOS transaction/message protocol level commands/command responses.

BAL Frame Data Packet

The BAL frame/data packet cycle is variable length. From 128 to 2K bytes of user I/O data, in increments of 128 bytes, may be transmitted in any given BAL frame/data packet cycle. The Sub-Packet Count in the Frame control fields specifies the amount of data being transmitted in the associated frame cycle.

Frame Data Signature

Following the transmission of frame data a 16 bit Frame Data Signature word is transmitted. This word is generated by the transmitting BIA by performing a "CRC—16 Polynomial Division Algorithm" on the preceding signal data or BAL frame/data packet. The receiving BIA also generates a Frame Data Signature on the received frame data words and compares it with the Frame Data Signature that was transmitted.

1.4.3.3 Points Within RTCN Bus Frame Cycles At Which State Matrix

Logic Operations Are Performed

As shown in FIG. 5 there are four points within a given frame cycle that the control sequencer may initiate a state matrix logic operation. Each point constitutes a given event type. During the transmission of frame acknowledgement, if the BIA had transmitted a frame the prior frame cycle, the control sequencer will receive the acknowledge code plus the ECC and present it to the state matrix logic for resolution of a Receive Frame Acknowledge Code Event. During available time during the bus contention frame cycle contention period the control sequencer will test the BIA Command Priority Queue, on the SM module, to see if it has one or more entries. If the queue is holding an entry, the sequencer will read one entry (the highest priority) from the queue. It will read the BIA command code from the PCB (in the SM module) indicated by index provided in the queue entry and present it to the state matrix logic for resolution of an I/O Port Command Event. During the frame control field period, if the BIA did not contend or lost bus frame contention during the preceding bus frame contention segment, the control sequencer will receive the frame control field data. It will use the received Target LPI parameter to read LPI memory (in the SM module). If the Target LPI is enabled at the node, it will present received frame control field data to the state matrix logic for resolution of a Received Frame Control Fields Event. If the state matrix logic output action code, from a preceding Received Frame Control Fields Event operation, directs the control sequencer to receive the frame data, the control sequencer will proceed to receive the data. It will enable the signature generator and transfer the data to the data buffer specified by the prior state matrix logic output action code. It will present the resulting data condition to the state matrix logic for resolution of a Received Frame Data Event.

1.5 Prior Art and Comparison with Implementation Using Control

Sequencer Incorporating State Matrix Logic

Figure 8:
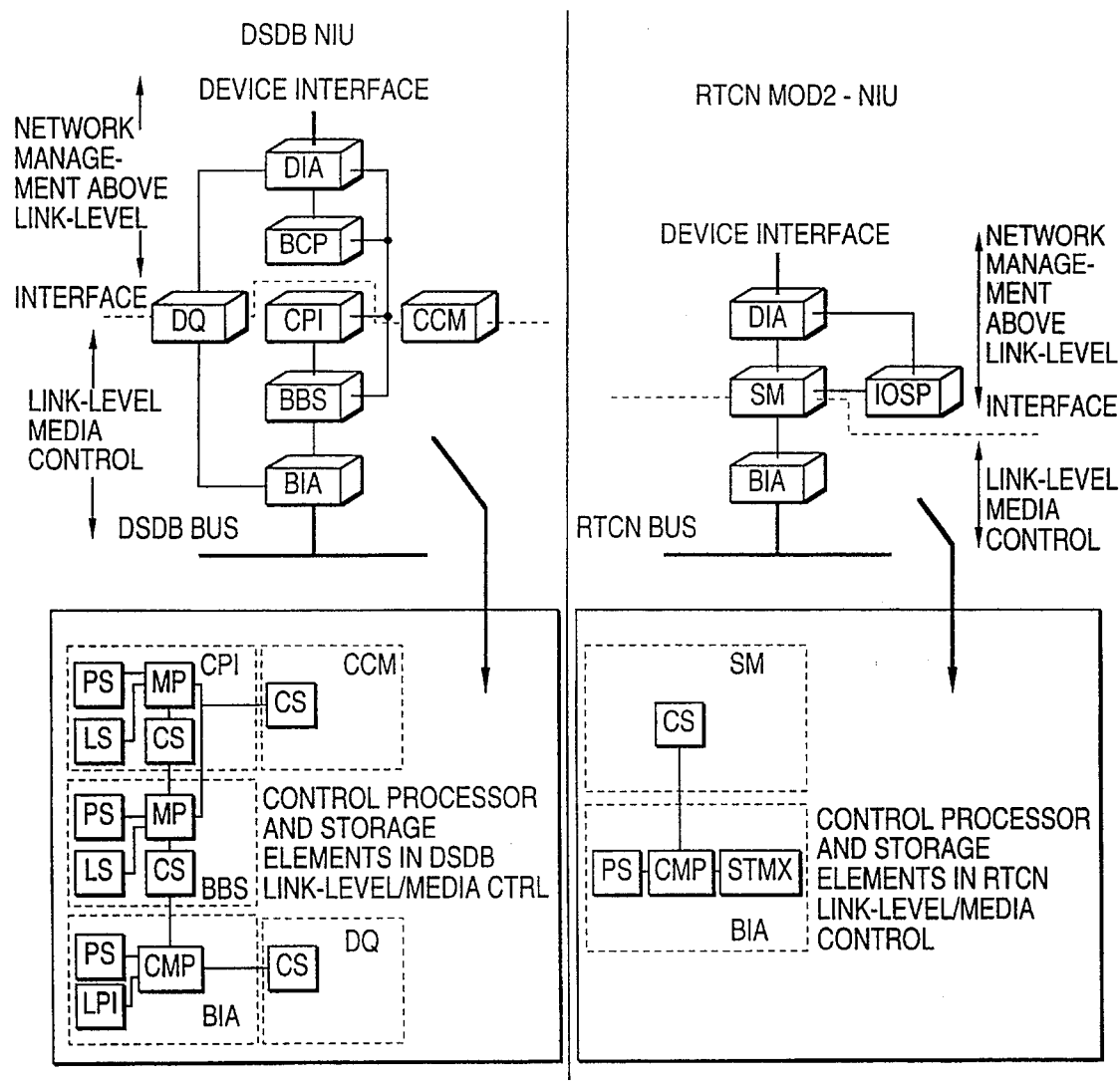
FIG. 8 is a comparison of the RTCN Bus Interface Adapter control sequencer incorporating state matrix logic.

FIG. 8 provides a comparison between the implementation of the example link-level/media control process using the control sequencer incorporating state matrix logic and the a prior art implementation. The prior art implementation is for the previously developed Distributed System Data Bus (DSDB). The RTCN is an architectural evolution and cost/performance enhancement of the DSDB. The basic bus architectures for both networks are very similar. At the top of FIG. 8 the functional module configurations for both an RTCN and DSDB NIU are shown and compared. In both cases the functional modules associated with link-level/media control are indicated. In the middle of the figure the control processor and storage resources on these modules are shown and compared. A required resource summary is provided at the bottom of the figure. In the RTCN implementation the single control processor incorporating and augmented by the state matrix logic performs the application control function that requires three conventional control sequencers/micro processors to perform in the DSDB implementation. Close examination of the microcode in the conventional microprocessors in the DSDB CPI and BBS modules shows that both processors are involved in reconciling detected events against current control process state. Both sets of application code in these two microprocessors are predominantly large sequential branch trees. The intrinsic application control problem is implementation of a state matrix which is best done by logic that closely emulates or functions like a state matrix. This is what the RTCN implementations unique control sequencer incorporating state matrix logic does.

SECTION 2—GENERAL STATE MATRIX OPERATIONS 2.1 BIA and SM Initialization

During NIU initialization the BIA control sequencer microcode performs the following operations. It sets the current state parameter in all the PCBs (on the SM module) to the Disabled State. It resets and clears the BIA Command Queue, the Bus Contend Queue, and the Work Step Dispatch Queue (all of which are on the SM module). It resets and clears all LPI entries in the LPI Memory (also on the SM module) to the disabled status. As a result no frame send or receive nor state matrix event processing will occur until NOS in the IOSP module issues an I/O Port command by entering same in a PCB and writing the PCB index into the BIA Command Queue.

The first event that the control sequencer will detect and present to the state matrix logic will be an I/O Port Command event.

2.2 I/O Port Command Event Processing

Figure 9:
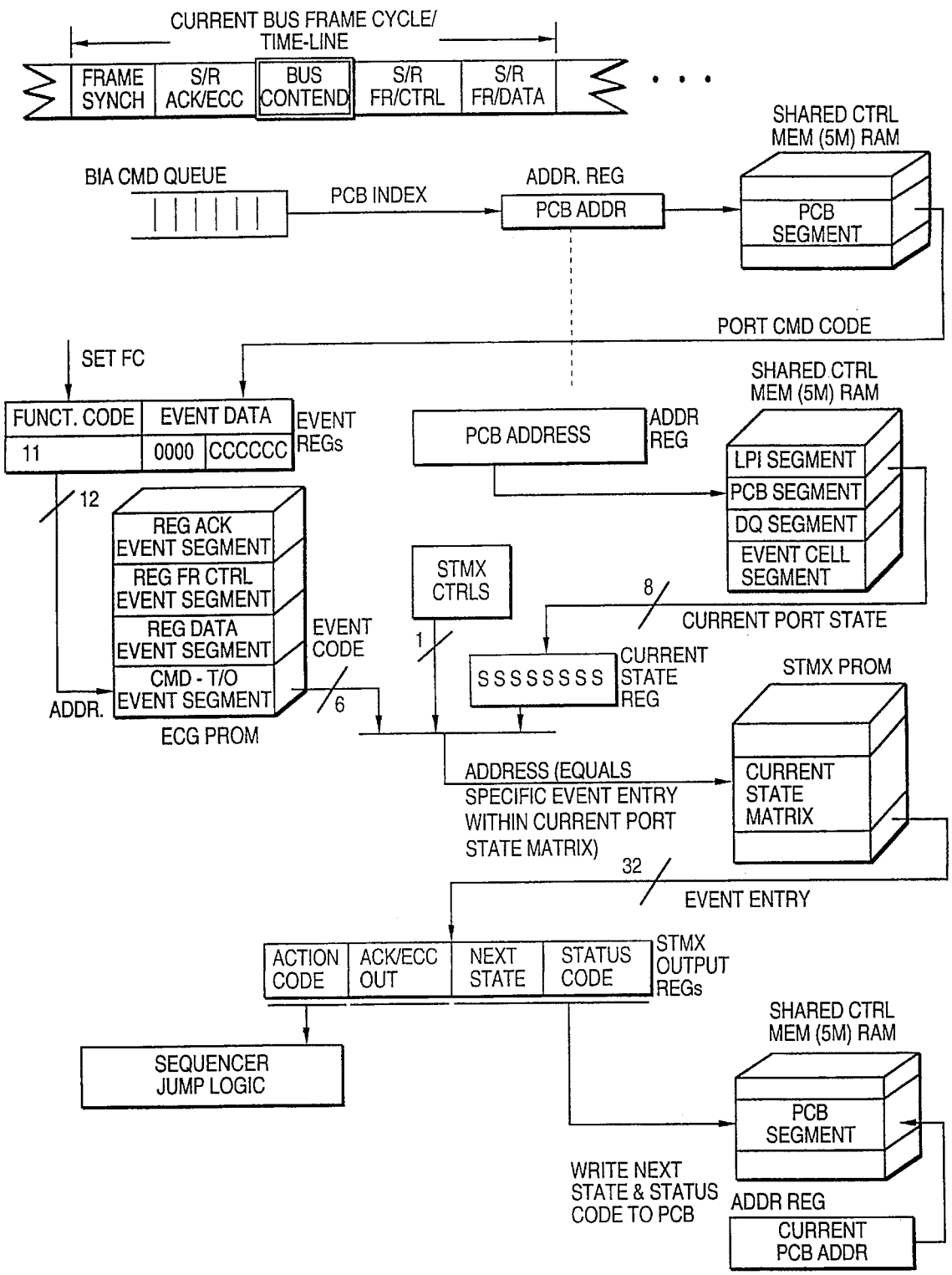
FIG. 9 illustrates the sequencer/state matrix operations for I/O port command event processing.

FIG. 9 illustrates I/O Port Command Event Processing which is described as follows.

2.2.1 Event Detection and State Matrix Input Parameter Assembly

In available time during the bus contend period within a frame cycle, the control sequencer tests the BIA Command Queue (on the SM module) for an entry. If the queue is not empty it reads an entry from the queue (the highest priority). The entry contains a PCB index. The sequencer converts the index to the address of the PCB's Command and Control Segment. It reads the current port state parameter and the the BIA command code from the PCB (in shared memory on the SM module).

2.2.2 State Matrix Event Code Generator (ECG) PROM Input, Output, and Event Data Compression The sequencer sets the function code for I/O Port Command event into the state matrix logic's Event Registers. It transfer the BIA command code (read from the PCB) to the event registers. The previously set function code causes the appropriate event data assembly into the Event Registers off of the internal BIA data bus as shown in FIG. 9. This initiates a read access of the state matrix logic's Event Code Generator (ECG) Prom. The output from the ECG PROM is a 6 bit event code which is gated into bits 1 through 6 of the State Matrix PROM. The partitioning of the ECG PROM, the coding of the I/O Port Command Event Segment, and the resulting I/O Port Command Event Data compression is shown in FIG. 10. As shown in FIG. 10 the function code, in the input format, segments the ECG PROM into 1K segments for each event type. The physical PROM used in the prototype (8K×8) is twice the size required (4K×8). The ECG PROM operation compresses the 64 I/O Port Command Event input data combinations to 19 6-bit event codes. The ECG PROM operation provides invalid command detection and produces an "Invalid Command" output event code. Unused or invalid ECG PROM locations in the command event segment are coded to produce an "Invalid ECG Location"to event code. Without the data compression provided by the ECG PROM stage of the state matrix logic the State Matrix PROM would have to be 16 times its current size (8megabits instead of 512K bits).

2.2.3 State Matrix PROM Input and Output

The 8 bit current state code read from the PCB (2.2.1 above) is transferred by the sequencer to the high order 8 bits of the state matrix logic's Current State Register prior to initiating ECG PROM operation. The ECG PROMS 6-bit event code output is concatenated with the low order 6-bits of the Current State Register initiating a read access of the State Matrix PROM. The specific 32-bit event code entry within the state matrix associated with current state is read and loaded into the State Matrix Output. Registers. The State Matrix PROM in the prototype is 32K×16. Each state matrix within the PROM is 128×16 which provides for a total of 256 state matrices. Each event code entry in a state matrix is 32 bits which provides for a maximum of 64 logical event codes (a logical state matrix is 64 event entries each containing 32 bits of output data. FIG. 11 is a general coding template for each of the state matrices (as presented by the State Matrix PROM Assembler program which was developed). It shows the possible event code entries. Of the maximum of 64 event code entries only 48 have currently been required and coded in the ECG PROM. The remaining 16 event codes are reserve and the associated state matrix entries as shown in FIG. 11 are designated "Invalid_Event_X". Each event code entry in a state matrix produces four 8-bit output parameters. They are "Next State Code", "Status Code", "Action Code", and "ACK/ECC Out".

2.2.4 Control Sequencer Operations On State Matrix Output Data

The control sequencer branches on the 8-bit Action Code output which is gated to the control sequencer's jump logic. The Action Code and the resultant action routine dictates what operations are to be performed on the remaining State Matrix PROM outputs and what operations are to be performed to complete the remainder of the current RTCN bus frame cycle.

The 8-bit Next State output is always stored in the Current State parameter location in the PCB (in the SM module) replacing the Current State parameter which was used in this state matrix operation (see FIG. 4). In certain cases the next state stored in the PCB may be the same as the current state that was accessed from the PCB (i.e. the detected event does not result in a state transition).

The Action Code output may dictate that the Status Code output also be stored in the PCB. In which case the action routine will also be directed to write the PCB's Index value into the Work Step Dispatch Queue (priority queue on the SM module—see 1.4.2.2.3) which will cause NOS, resident in the NIU's IOSP module to perform a work step (processing) on the PCB.

If current state is valid for I/O port command initiation, the command code is valid, and the I/O port command operation begins with an RTCN bus frame transmit operation, the Action Code output will direct that the PCB's Index value be written into the Bus Contend Queue (priority queue on the SM module—see 1.4.2.2.1).

The 8-bit Frame ACK/ECC output is never used in I/O port command event processing.

2.3 Receive Frame Acknowledge Code Event Processing

Figure 12:
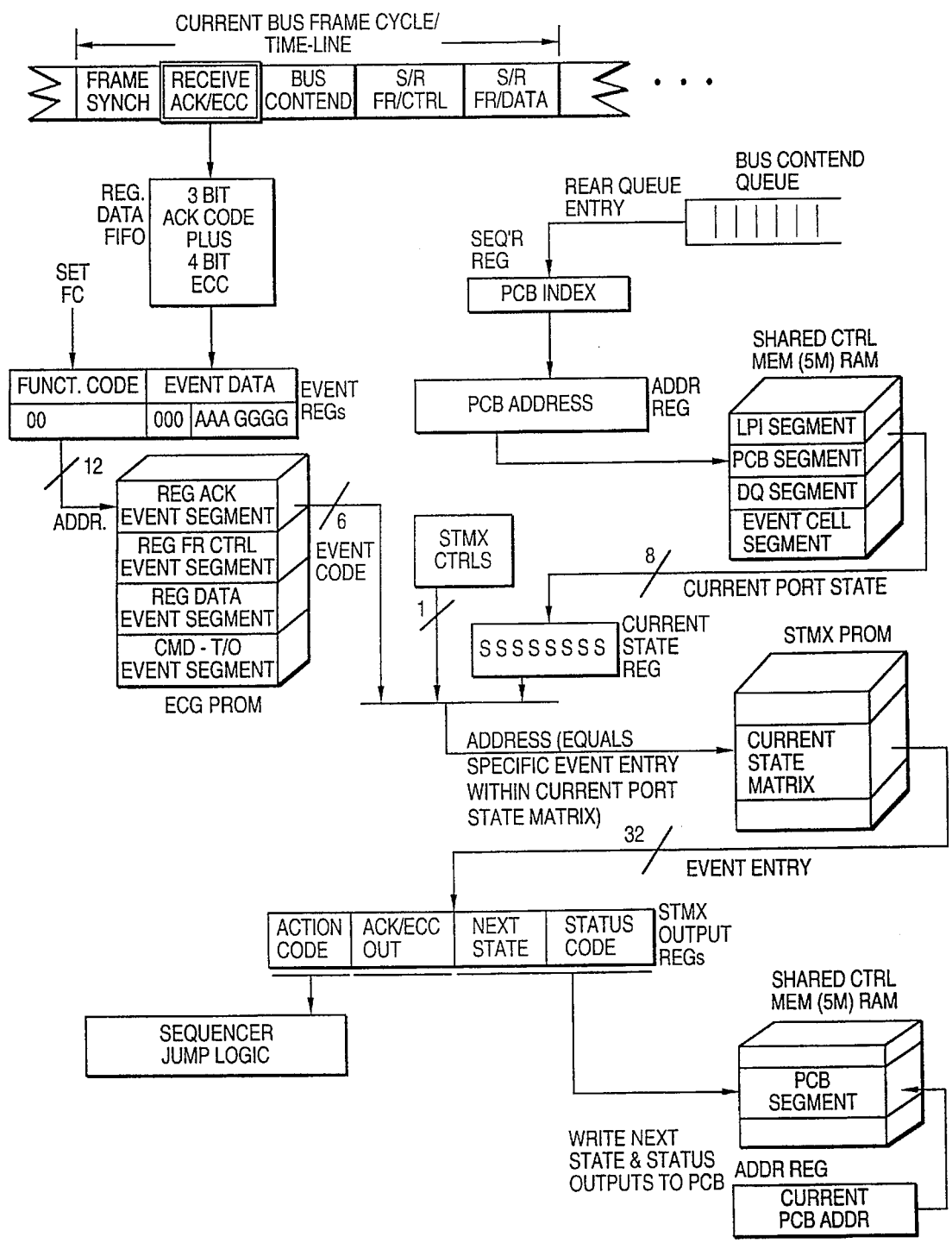
FIG. 12 illustrates the sequencer/state matrix operations for receive frame acknowledge code events.

FIG. 12 illustrates Receive Frame Acknowledge Code Event Processing which is described as follows.

2.3.1 Event Detection and State Matrix Input Parameter Assembly

If the control sequencer transmitted an RTCN bus frame during the previous frame cycle it will save the associated PCB's Index value and enable the reception of the 3-bit frame acknowledge code and associated 4-bit error correcting code (ACK/ECC) during the current frame cycle. The sequencer converts the saved PCB index to the address of the PCB's Command and Control Segment. It reads the current port state parameter from the PCB.

Figure 13:
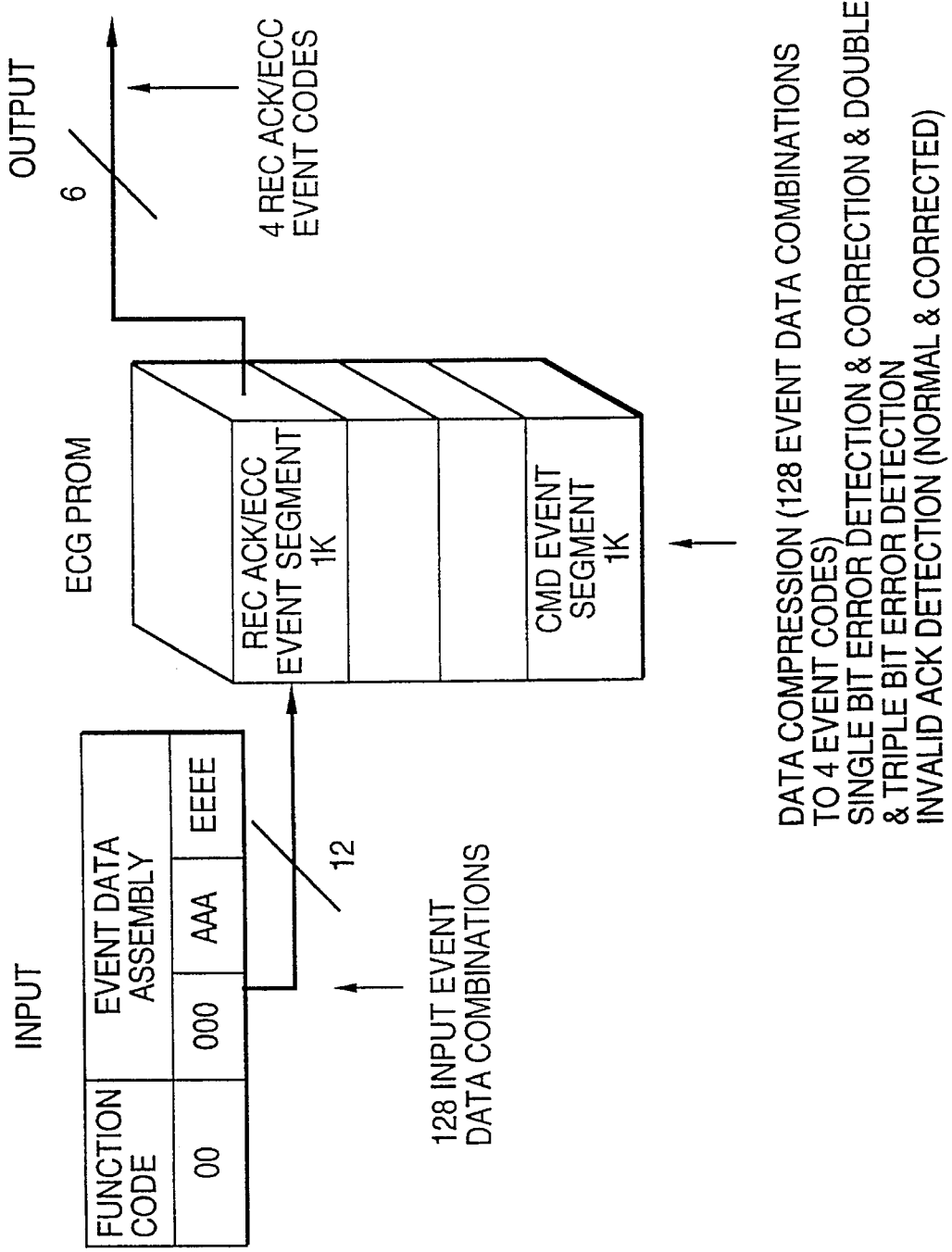
FIG. 13 illustrates the general partitioning and coding of the Event Code Generator (ECG) PROM for receive frame acknowledge code event processing.

2.3.2 State Matrix Event Code Generator (ECG) PROM Input, Output, and Event Data Compression The sequencer sets the 2-bit function code for Receive Frame Acknowledge Code event into the state matrix logic's Event Registers. It transfers the 7-bit frame ACK/ECC from the Receive Data FIFO to the event registers. The previously set function code causes the appropriate event data assembly into the Event Registers off of the internal BIA data bus as shown in FIG. 11. This initiates a read access of the state matrix logic's Event Code Generator (ECG) Prom. The output from the ECG PROM is a 6 bit event code which is gated into bits 1 through 6 of the State Matrix PROM. The partitioning of the ECG PROM, the coding of the Receive Frame ACK/ECC Event Segment, and the resulting Receive Frame ACK/ECC Event Data compression is shown in FIG. 13. As shown in FIG. 13 the function code, in the input format, segments the ECG PROM into 1K segments for each event type. The physical PROM used in the prototype (8K×8) is twice the size required (4K×8). The ECG PROM operation compresses the 128 Receive Frame ACK/ECC Event input data combinations to 4 6-bit event codes. The ECG PROM coding & operation provides the single bit error detection and correction and double and triple bit error detection associated with the ECC. Invalid (unused/reserved Ack codes are detected. Unused or invalid ECG PROM locations in the this event segment are coded to produce an "Invalid ECG Location" output event code. Without the data compression provided by the ECG PROM stage of the state matrix logic the State Matrix PROM would have to be 16 times its current size (8 megabits instead of 512K bits).

2.3.3 State Matrix PROM Input and Output

The 8bit current state code read from the PCB (2.3.1 above) is transferred by the sequencer to the high order 8 bits of the state matrix logic's Current State Register prior to initiating ECG PROM operation. The ECG PROMS 6-bit event code output is concatenated with the low order 6-bits of the Current State Register initiating a read access of the State Matrix PROM. The specific 32-bit event code entry within the state matrix associated with current state is read and loaded into the State Matrix Output Registers. The State Matrix PROM in the prototype is 32K×16. Each state matrix within the PROM is 128×16 which provides for a total of 256 state matrices. Each event code entry in a state matrix is 32 bits which provides for a maximum of 64 logical event codes (a logical state matrix is 64 event entries each containing 32 bits of output data. FIG. 11 is a general coding template for each of the state matrices (as presented by the State Matrix PROM Assembler program which was developed). It shows the possible event code entries. Of the maximum of 64 event code entries only 48 have currently been required and coded in the ECG PROM. The remaining 16 event codes are reserve and the associated state matrix entries as shown in FIG. 11 are designated "Invalid_Event_ X". Each event code entry in a state matrix produces four 8-bit output parameters. They are "Next State Code", "Status Code", "Action Code", and "ACK/ECC".

2.3.4 Control Sequencer Operations On State Matrix Output Data

The control sequencer branches on the 8-bit Action Code output which is gated to the control sequencer's jump logic. The Action Code and the resultant action routine dictates what operations are to be performed on the remaining State Matrix PROM outputs and what operations are to be performed to complete the remainder of the current RTCN bus frame cycle. The action code set and associated operations established for this application design are defined in A.8 of the appendix.

The 8-bit Next State output is always stored in the Current State parameter location in the PCB (in the SM module) replacing the Current State parameter which was used in this state matrix operation (see FIG. 4). In certain cases the next state stored in the PCB may be the same as the current state that was accessed from the PCB (i.e. the detected event does not result in a state transition).

The Action Code output may dictate that the Status Code output also be stored in the PCB. In which case the action routine will also be directed to write the PCB's Index value into the Work Step Dispatch Queue (priority queue on the SM module—see 1.4.2.2.3) which will cause NOS, resident in the NIU's IOSP module to perform a work step (processing) on the PCB.

The 8-bit Frame ACK/ECC output is never used in Receive Frame Acknowledge Code event processing.

2.4 Receive Frame Control Fields Event Processing

Figure 14:
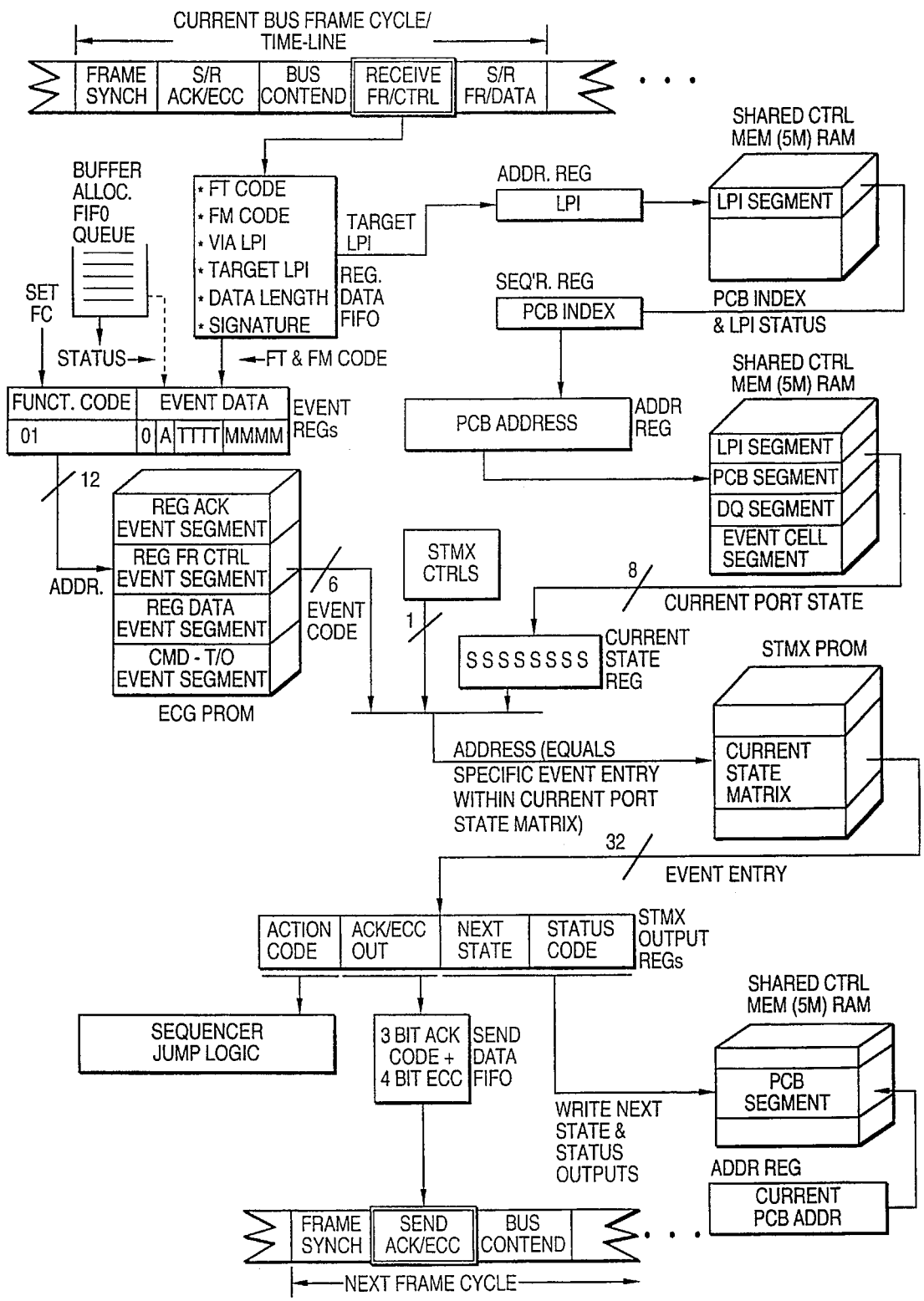
FIG. 14 illustrates the sequencer/state matrix operations for receive frame control fields event processing.

FIG. 14 illustrates Receive Frame Control fields Event Processing which is described as follows.

2.4.1 Event Detection and State Matrix Input Parameter Assembly

If another node contended for and won transmit access to the RTCN bus during a given frame cycle the control sequencer enables the reception of the transmitted frame control fields (see FIG. 7) into the Receive Data FIFO. It reads the received Frame Directed Target LPI parameter from the Receive Data FIFO. It uses this parameter to read the LPI Memory Segment on the SM module (see 1.4.2.2.8). It checks the enabled bit in the LPI Memory entry. If the LPI is enabled the use the PCB index value provided in the LPI Memory entry to read the associated PCB's Command and Control Segment (see FIG. 4) on the SM module. It reads the current port state parameter from the PCB.

Figure 15:
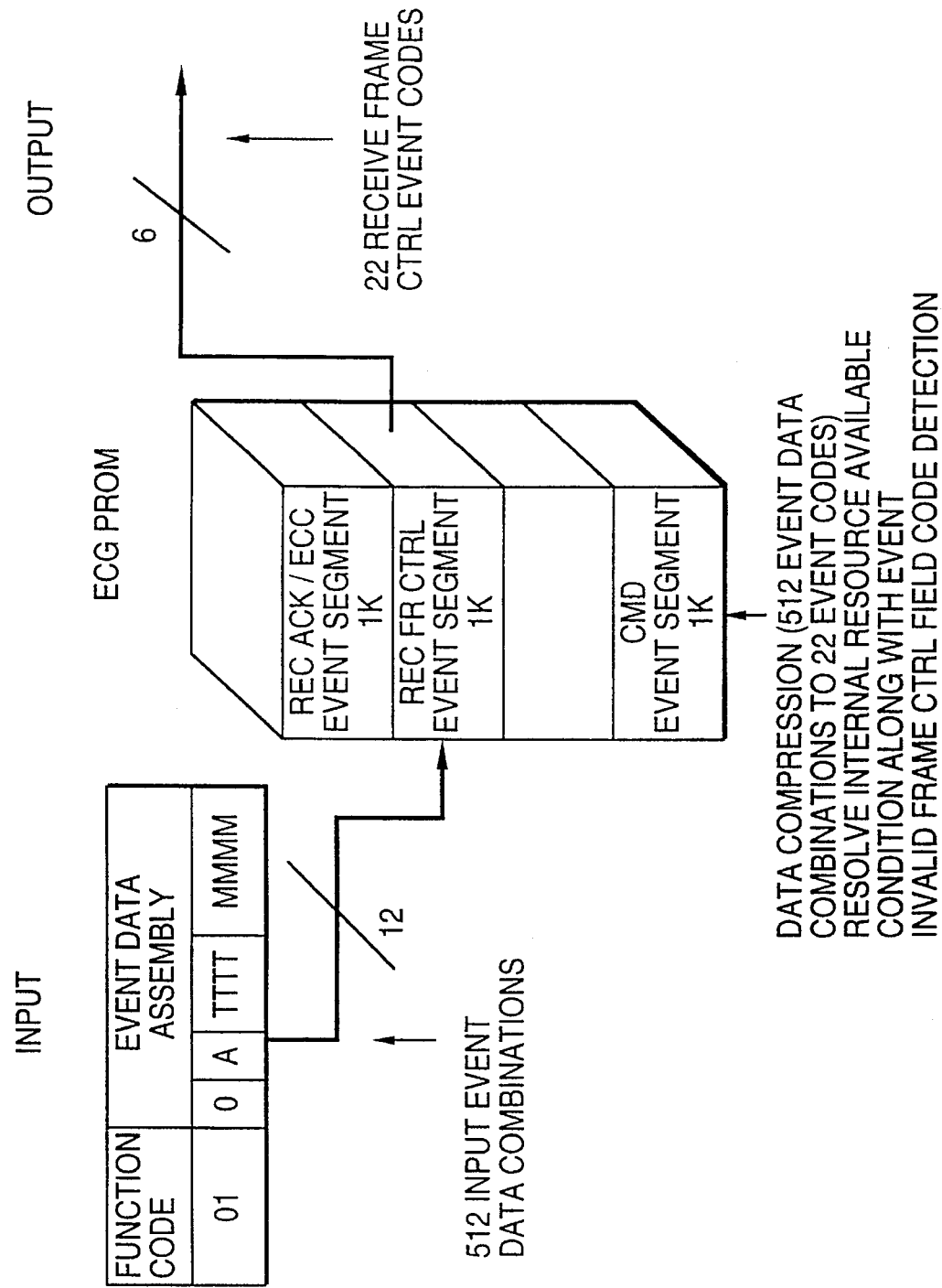
FIG. 15 illustrates the general partitioning and coding of the Event Code Generator (ECG) PROM for receive frame control fields event processing.

2.4.2 State Matrix Event Code Generator (ECG) PROM Input, Output, and Event Data Compression The sequencer sets the 2-bit function code for Receive Frame Control Fields event into the state matrix logic's Event Registers. This causes the Event Cell Allocation FIFO Queue's Empty Status bit (from the SM module) to be gated into the Event Registers (a single bit wired directly to the Event Register's input). It transfers the 4-bit Frame Type Code (FTM) and the 4-bit Frame Modifier Code (FTM) from the Receive Data FIFO to the event registers. The previously set function code causes the appropriate event data assembly into the Event Registers off of the internal BIA data bus as shown in FIG. 14. In this case internal resource availability condition is combined with the external event data. This initiates a read access of the state matrix logic's Event Code Generator (ECG) Prom. The output from the ECG PROM is a 6 bit event code which is gated into bits 1 through 6 of the State Matrix PROM. The partitioning of the ECG PROM, the coding of the Receive Frame Control Fields Event Segment, and the resulting Receive Frame Control Fields Event Data compression is shown in FIG. 15. As shown in FIG. 15 the function code, in the input format, segments the ECG PROM into 1K segments for each event type. The physical PROM used in the prototype (8K×8) is twice the size required (4K×8). The ECG PROM operation compresses the 512 Receive Frame Control Fields Event input data combinations to 22 6-bit event codes. The ECG PROM coding & operation provides invalid frame control field code detection. Unused or invalid ECG PROM locations in the this event segment are coded to produce an "Invalid ECG Location" output event code. Without the data compression provided by the ECG PROM stage of the state matrix logic the State Matrix PROM would have to be 16 times its current size (8 megabits instead of 512K bits).

2.4.3 State Matrix PROM Input and Output

The 8 bit current state code read from the PCB (2.4.1 above) is transferred by the sequencer to the high order 8 bits of the state matrix logic's Current State Register prior to initiating ECG PROM operation. The ECG PROMS 6-bit event code output is concatenated with the low order 6-bits of the Current State Register initiating a read access of the State Matrix PROM. The specific 32-bit event code entry within the state matrix associated with current state is read and loaded into the State Matrix Output Registers. The State Matrix PROM in the prototype is 32K×16. Each state matrix within the PROM is 128×16 which provides for a total of 256 state matrices. Each event code entry in a state matrix is 32 bits which provides for a maximum of 64 logical event codes (a logical state matrix is 64 event entries each containing 32 bits of output data. FIG. 11 is a general coding template for each of the state matrices (as presented by the State Matrix PROM Assembler program which was developed). It shows the possible event code entries. Of the maximum of 64 event code entries only 48 have currently been required and coded in the ECG PROM. The remaining 16 event codes are reserve and the associated state matrix entries as shown in FIG. 11 are designated "Invalid_Event_ X". Each event code entry in a state matrix produces four 8-bit output parameters. They are "Next State Code", "Status Code", "Action Code", and "ACK/ECC Out".

2.4.4 Control Sequencer Operations On State Matrix Output Data

The control sequencer branches on the 8-bit Action Code output which is gated to the control sequencer's jump logic. The Action Code and the resultant action routine dictates what operations are to be performed on the remaining State Matrix PROM outputs and what operations are to be performed to complete the remainder of the current RTCN bus frame cycle. The action code set and associated operations established for this application design are defined in A.8 of the appendix.

The 8-bit Next State output is always stored in the Current State parameter location in the PCB (in the SM module) replacing the Current State parameter which was used in this state matrix operation (see FIG. 4). In certain cases the next state stored in the PCB may be the same as the current state that was accessed from the PCB (i.e. the detected event does not result in a state transition).

The Action Code output may dictate that the Status Code output also be stored in the PCB. In which case the action routine will also be directed to write the PCB's Index value into the Work Step Dispatch Queue (priority queue on the SM module—see 1.4.2.2.3) which will cause NOS, resident in the NIU's IOSP module to perform a work step (processing) on the PCB.

The Action Code may direct that the 8-bit Frame ACK/ECC output from the state matrix be saved by the sequencer and transmitted during the next RTCN bus frame cycle.

The Action Code may direct the sequencer to transfer the received frame control fields to an event cell buffer. In which case, the sequencer reads an entry from the Event Cell Allocation FIFO Queue. The entry contains the index of an available Event Cell Buffer (on the SM module—see 1.4.2.2.8). The sequencer transfers the received frame control fields from the Receive Data FIFO to the specified event cell buffer. The sequencer enables the reception of subsequent frame data from the RTCN bus to the Receive Data FIFO.

The Action Code may direct the sequencer to transfer the received frame control fields to the Receive Frame Buffer Segment in the PCB. In which case, the sequencer transfers the received frame control fields from the Receive Data FIFO to the PCB using the PCB index established in 2.4.1 above. The sequencer enables the reception of subsequent frame data from the RTCN bus to the Receive Data FIFO.

The action code may direct the sequencer to discard the frame control fields data in the Receive Data FIFO and proceed directly to next frame cycle synchronization.

2.5 Receive Frame Data Event Processing

Figure 16:
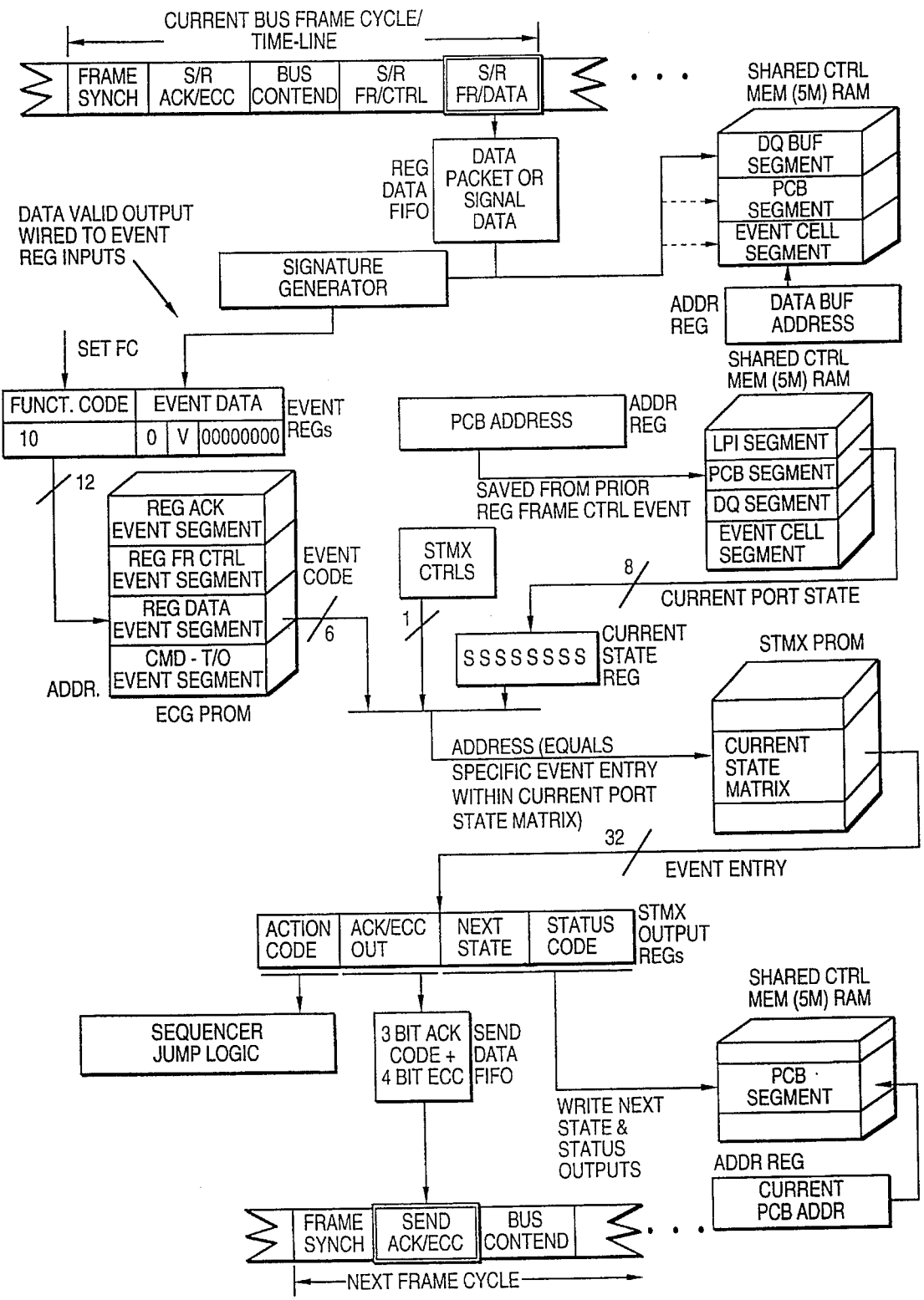
FIG. 16 illustrates the sequencer/state matrix operations for receive frame data event processing.

FIG. 16 illustrates Receive Frame Data Event Processing which is described as follows.

2.5.1 Event Detection and State Matrix Input Parameter Assembly

If the state matrix Action Code output from Receive Frame Control Fields Event processing (see 2.4 above) directed the sequencer to receive frame data. The sequencer will enable the reception of the RTCN bus frame data into the Receive Data FIFO. The sequencer enables the Signature Generator (see 1.4.1.2.3). The sequencer then transfers the frame data from the Receive Data FIFO to one of three possible data buffers on the SM module ( Data Queue Buffer (DQ), Event Cell, or PCB Receive Frame Data Buffer Segment—the later two are for signal frame data only) as specified by the Action Code. It then reads the current port state parameter from the PCB using the PCB Index saved from the prior Receive Frame Control Fields Event processing.

Figure 17:
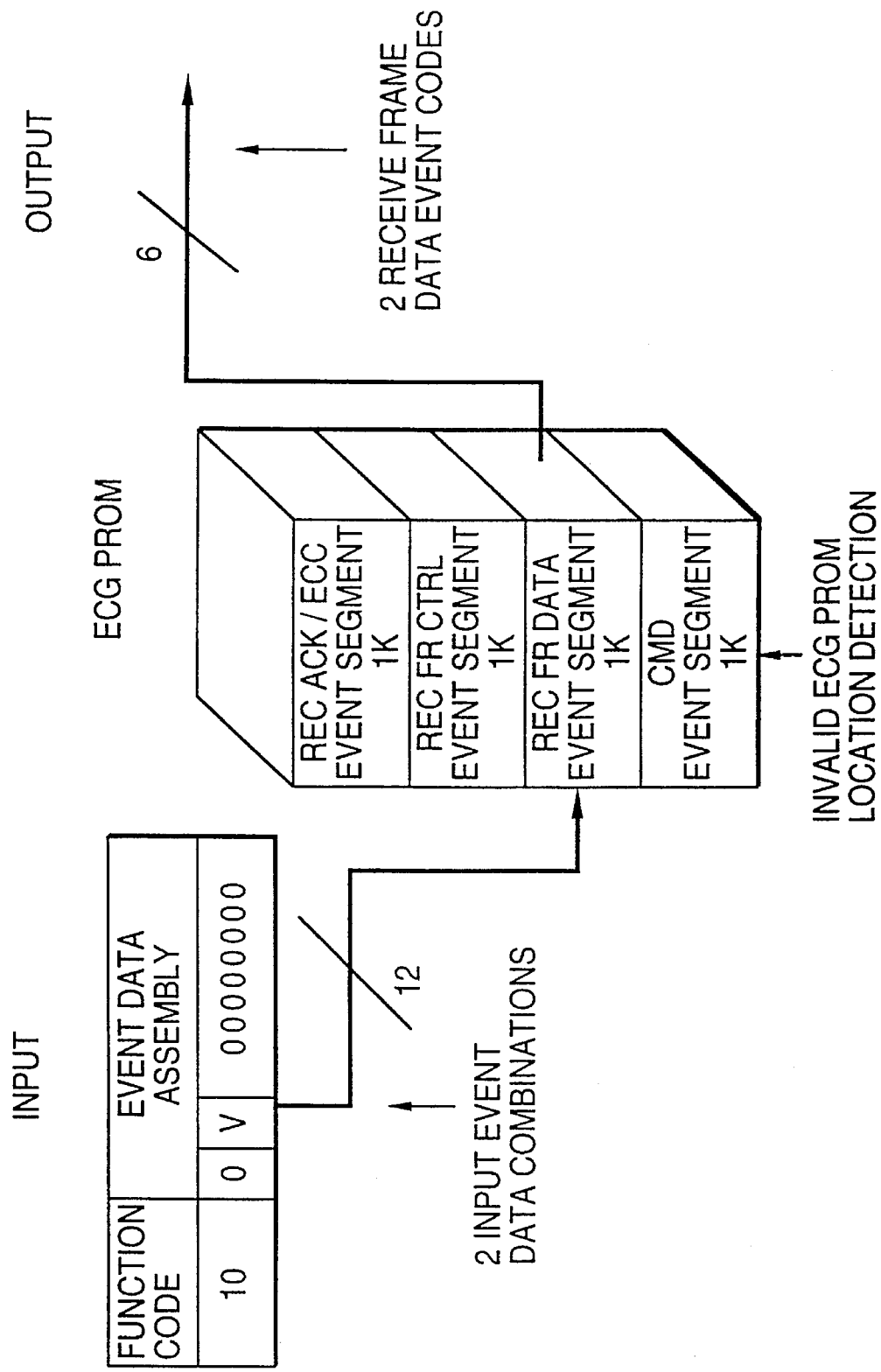
FIG. 17 illustrates the general partitioning and coding of the Event Code Generator (ECG) PROM for receive frame data event processing.

2.5.2 State Matrix Event Code Generator (ECG) PROM Input, Output, and Event Data Compression The sequencer sets the 2-bit function code for Receive Frame Data event into the state matrix logic's Event Registers. This causes the Signature Generator's "Data Valid" output to be gated to the Event Registers (a single bit wired directly to the Event Registers inputs). This, in turn, initiates a read access of the state matrix logic's Event Code Generator (ECG) Prom. The output from the ECG PROM is a 6 bit event code which is gated into bits 1 through 6 of the State Matrix PROM. The partitioning of the ECG PROM, the coding of the Receive Frame Data Event Segment, and the resulting Receive Frame Data Event Data compression is shown in FIG. 17. As shown in FIG. 17 the function code, in the input format, segments the ECG PROM into 1K segments for each event type. The physical PROM used in the prototype (8K×8) is twice the size required (4K×8). The ECG PROM operation performs no data compression on the Receive Frame Data Event input data as their are only 2 input data combinations. Unused or invalid ECG PROM locations in the this event segment are coded to produce an "Invalid ECG Location" output event code.

2.5.3 State Matrix PROM Input and Output

The 8 bit current state code read from the PCB (2.5.1 above) is transferred by the sequencer to the high order 8 bits of the state matrix logic's Current State Register prior to initiating ECG PROM operation. The ECG PROMS 6-bit event code output is concatenated with the low order 6-bits of the Current State Register initiating a read access of the State Matrix PROM. The specific 32-bit event code entry within the state matrix associated with current state is read and loaded into the State Matrix Output. Registers. The State Matrix PROM in the prototype is 32K×16. Each state matrix within the PROM is 128×16 which provides for a total of 256 state matrices. Each event code entry in a state matrix is 32 bits which provides for a maximum of 64 logical event: codes (a logical state matrix is 64 event entries each containing 32 bits of output data. FIG. 11 is a general coding template for each of the state matrices (as presented by the State Matrix PROM Assembler program which was developed). It shows the possible event code entries. Of the maximum of 64 event code entries only 48 have currently been required and coded in the ECG PROM. The remaining 16 event codes are reserve and the associated state matrix entries as shown in FIG. 11 are designated "Invalid_Event_X". Each event code entry in a state matrix produces four 8-bit output parameters. They are "Next State Code", "Status Code", "Action Code", and "ACK/ECC Out".

2.5.4 Control Sequencer Operations On State Matrix Output Data

The control sequencer branches on the 8-bit Action Code output which is gated to the control sequencer's jump logic. The Action Code and the resultant action routine dictates what operations are to be performed on the remaining State Matrix PROM outputs and what operations are to be performed to complete the remainder of the current RTCN bus frame cycle.

The 8-bit Next State output is always stored in the Current State parameter location in the PCB (in the SM module) replacing the Current State parameter which was used in this state matrix operation (see FIG. 4). In certain cases the next state stored in the PCB may be the same as the current state that was accessed from the PCB (i.e. the detected event does not result in a state transition).

The Action Code output may dictate that the Status Code output also be stored in the PCB. In which case the action routine will also be directed to write the PCB's Index value into the Work Step Dispatch Queue (priority queue on the SM module—see 1.4.2.2.3) which will cause NOS, resident in the NIU's IOSP module to perform a work step (processing) on the PCB.

The Action Code may direct that the 8-bit Frame ACK/ECC output from the state matrix be saved by the sequencer and transmitted during the next RTCN bus frame cycle.

SECTION 3—EXCHANGE SIGNALS PORT COMMAND STATE MATRIX CODING AND OPERATIONS EXAMPLE 3.1 EXCHANGE SIGNALS COMMAND EXAMPLE

This section provides an overview of actual state matrix logic coding for of the BIA I/O Port Command operations. The command is "Exchange Signals" which is defined as follows.

3.2 Definition of Exchange Signals Command 3.2.1 Purpose

The purpose of this command is to transmit a signal frame then wait on and receive a returned signal frame. The specified LPI memory entry word is written into a specified LPI memory location prior to the signal frame transmission. Upon normal termination of this command the port transitions to the "Monitor Signals" state.

3.2.2 Input/Output Parameters

NOS must write the following input parameters into the port's PCB prior to initiating this command:

PCB Command And Control Segment (see FIG. 4)
* Command Code
* Transmit Frame Buffer Flag
* Associated LPI Address
* LPI Memory Entry Word (normally specifying enabled state and port/PCB index association)
* Transaction Step Time Out Value
* NOS Workstep ID & Priority Code PCB Transmit Frame Buffer Segment
* Words 1 through 13 for the signal frame to be transmitted The BIA returns the following output parameters in the port's PCB as a result of the completion of normal command execution or upon exception termination:

PCB Command And Control Segment (see FIG. 4)
* Command Response Status Code
* Received Frame ACK/ECC Code PCB Receive Frame Buffer Segment
* Any signal frame received in words 1 through 13

3.2.3 Operations

This command may be issued to a port in either the disabled, open, or a monitor state. The signal frame transmission portion of this commands operation proceeds similarly to the "Send Signal" command including retry on returned ACK/ECC exception condition and received signal frame preemption. Upon successful transmission of the signal frame, rather than terminating, this command proceeds to wait on and receive any returned signal frame. If a signal frame is received and the received signal data is good, the BIA returns a "Good" ACK/ECC and terminates command operation by writing "Normal Command End" command response status into the PCB and writing the port's ID/PCB index, NOS Workstep ID, and Priority Code into the BIA Command Response Queue which causes an interrupt request to be generated to the host processor (PC_AT). Received signal data is written into the PCB receive frame buffer segment. The port transitions to the "Monitor Signals" state.

If bad signal data is received the BIA will return a "RED" ACK/ECC and proceed to wait for and receive a retransmission. It will do so only twice. If upon the third signal frame reception the received signal data is still bad, the BIA will return a "RED" ACK/ECC and terminate command execution with "Bad Signal Data Received" command response status written into the PCB. The last signal frame received will be written into the PCB receive frame buffer segment.

If either a Token or BAL frame is received instead of a signal frame the BIA will return a "SEQE" ACK/ECC and terminate command execution with "Protocol Exception" command response status written into the PCB. The received Token or BAL frame is written into the PCB receive buffer segment.

If a signal frame containing either a "Read Sense", "Read PM/FL Status", "Read Manager Flags", "Test and Set Manager Flag", or "Maintain Manager Flag" immediate command is received, the BIA will return an "LPI Exception" ACK/ECC and proceed to wait on and receive another signal frame.

If an immediate "Purge" command is received the BIA will write disabled state to the associated LPI memory location and terminate command execution with "Purge Received" command response status written to the PCB. If this command terminates with any status other than "Normal Command End" the port will transition to the "Operation End" or "Operation End/Machine Check" state rather then the "Monitor Signals" state.

3.2.4 Applicable Response Status Conditions

Command response status conditions applicable to this command, which are output by the state matrix logic, are as follows.

* Normal Command End (01 hex.)
* Bad ACK Received (02 hex.)
* Time Out (03 hex.)
* Preemptive Signal Received (04 hex.)
* Preemptive HIO Received (05 hex.)
* Preemptive FXR Received (06 hex.)
* Purge Received (07 hex.)
* Preemptive Signal/Bad Data Received (08 hex.)
* Protocol Exception (09 hex.)
* Bad Signal Data Received (0A hex.)
* Uncleared Machine Check Condition (0C hex.)
* Program Check Invalid BIA Command (20 hex.)
* Program Check Illegal BIA Command Sequence (21 hex.)
* program Check Port Busy (22 hex.)
* Machine Check Received Data/Waiting ACK (30 hex.)
* Machine Check Received Data/Waiting Frame Ctrl (32 hex.)
* Machine Check Received ACK/Waiting Frame Ctrl (33 hex.)
* Machine Check Received ACK/Waiting Data (34 hex.)
* Machine Check Received Frame Ctrl/Waiting Data (36 hex.)
* Machine Check Time Out/Waiting Data (38 hex.)
* Machine Check BIA Command/Waiting Data (3A hex.)
* Machine Check Invalid Event (40 hex.)
* Machine Check Invalid ECG PROM Location (50 hex.)

3.3 High Level State Transition Diagram

High-level state transition diagrams are part of the documentation of the state matrix logic coding. They identify all of the states and state matrices associated with a BIA I/O port command's operation. They also show the state transitions for general event categories. They reference actual state matrix source code files. FIG. 18 provides a key for reading the high-level state transition diagrams. Three high-level state transition diagrams cover the operation of the example "Exchange Signals Command". FIG. 19 is the state transition diagram for the "Disabled State" which is one of the general/common port state that a port must be in for acceptance of a port command. FIG. 20 is the high-level state transition diagram for the example "Exchange Signals" command. It covers the signal frame transmit portion of the command operations. As shown in this figure, only three state matrices are required and unique to this command's operations. FIG. 21 is a high-level state matrix diagram for the common "Receive Signal Frame" routine which covers the receive signal frame portion of the example "Exchange Signals" command operations. As you can see from this the state matrix logic coding allows a form of subroutinizing. In the discussion that follows we will primarily trace the normal events and state transitions associated with the example command operations as highlighted on the high-level state transition diagrams.

3.4 Disabled State

An I/O port command is normally issued to a port when it is in either the common "Disabled" or "Opend" states (i.e the current state parameter in the Command and Control Segment of the port's PCB indicates "Disabled" or "Opend"). As shown FIG. 19, the high-level state transition diagram for the common "Disabled" state, a valid command event code causes the port to transition to the initial state associated with the command operations. FIG. 22 is the actual assembler source code for the the state matrix for the "Disabled" state. We will review selected event code entries in this matrix code in the discussion that follows.

In the Disabled state the I/O port is normally waiting on a BIA command event to enable the port and initiate I/O operations. The normal event in this example is "Exchange Signals" command event. This event entry in the state matrix source code in FIG. 22 is on page 2 of the figure, and is marked text reference 4. The Next State output is "EXSIGS_WT_RECACK_1", which is the first state in the execution of this commands operations (see 3.5 below). This state is stored in the PCB replacing the Disabled state. The Status Code output is coded "None" indicating that no command response status is to be stored in the PCB at this state transition. The ACK Out output coded "Null" as the Action Code output does not specify a frame ACK/ECC transmission. The Action Code output, which is gated to the sequencer's jump logic is coded "WR_BUSQ/LPI/INITTO". This sequencer action routine, which is normal for a commanded operation that begins with a frame transmission on the RTCN bus, performs the following discrete actions:

1. Write Next State output to the PCB.
2. Write PCB index to the Bus Contend Queue.
3. Write LPI entry word specified in the PCB to the LPI Memory location specified in the PCB. (see PCB Command and Control Segment format in FIGS. 1–4)
4. Initialize the PCB Timeout Counter
5. Return to time line services at the normal point from BIA command event.

As shown in the state matrix source code in FIG. 22, Receive ACK/ECC events (text reference 1), Receive Frame Control Fields events (text reference 2), Invalid event (i.e. unused/reserve event code) (text reference 3), Receive Frame Data Event (text reference 7), and Invalid ECG Location (text reference 8) are all machine check conditions. The are all coded with a Next State output of "DISABLED_MACH_CHK" which causes the port to transition to the Disabled Machine Check state. The Status Code output for each of these events is coded to indicate the specific machine check condition. The Action Code Outputs for these events are coded "LOG_ST/PCBI". This sequencer action routine performs the following discrete actions:

1. Write Next State output to the PCB.
2. Write Status output to the Machine Check Log Buffer (on the SM module).
3. Write the PCB Index to the Machine Check Log Buffer.
4. Return to time line services based upon Timeline Exit Code saved prior to going to state matrix for event resolution.

Note that Receive Frame ACK/ECC, Receive Frame Control Fields, and Receive Frame Data events are machine check conditions because in the Disabled state the port is not performing I/O operations and its PCB index is not entered in any enabled LPI Memory (e.g. logical frame address association memory). The only way in which these events can be associated to this port/PCB as a result of a hardware error.

The state matrix source code in FIG. 22 illustrates some command exception conditions. "XMIT_DAT_CMD" event (text reference 5) is an illegal command sequence. The port must be in either the "OPEND" or one of the "MONITOR" states for this command to be accepted. "INVALID_CMD" event (text reference 6) is an unused/reserved command code. In both cases, the Next State output is coded "DISABLED" which causes the port to remain in the Disabled state. The Status Code outputs are coded "PC_ILLEGAL_CMDSEQ" and "PC_INVALID_CMD" respectively. The Action Code outputs are coded "WR_STAT/CRQ/CLTO". This sequencer action routine performs the following discrete actions:

1. Write Next State output to the PCB.
2. Clear the PCB Time Out Counter.
3. Write Status Code output to the PCB.
4. Write the PCB Index to the Workstep Dispatch Queue.
5. Return to time line services at the normal point from BIA command event.

3.5 Exchange Signals Wait on First Receive Frame Acknowledge (EXSIGS_WT_RECACK_1) State As shown in the high-level state transition diagram, FIG. 20, this is the initial state in the execution of the Exchange Signals command operations. In this state (see prior state transition actions in 3.4 above) the port is waiting on the sequencer to transmit the signal frame and the return of a Receive Frame ACK/ECC event (normal event in this state). FIG. 23 is the State Matrix PROM source code for this state matrix. We will review selected event code entries in this matrix code in the discussion that follows.

The normal event for this state is "GOOD_ACK" (a Receive Frame ACK/ECC event) which is shown in the state matrix source code in FIG. 23 (text reference 1). The Next State output for this normal state transition is coded "RSIG_WAIT SIG_1" which is the first state in the common Receive Signals operations. The Status Code output is coded "None" indicating that no command response status is to be stored in the PCB at this state transition. The ACK Out output coded "Null" as the Action Code output does not specify a frame ACK/ECC transmission. The Action Code output, which is gated to the sequencer's jump logic is coded "WR_ACK_TO_PCB". This sequencer action routine, which is normal for a Receive ACK/ECC event that does not terminate port command operations, performs the following discrete actions:

1. Write Next State output to PCB.
2. Write received ACK/ECC to PCB.
3. Return to time line services at start of bus contend this frame cycle.

The state matrix control procedures for this command's operations will retry frame transmission twice if either a "RED_ACK" or "NULL_ACK" Receive Frame ACK/ECC event occurs. The coding for this is illustrated by the coding for "NULL_ACK" event in FIG. 23 (text reference 2). The Next State output is coded "EXSIGS_WT_RECACK_2". This state is similar to the current state except that it is the second transmission attempt (i.e. first retry). The Action Code output is coded "WR_BUSQ". This sequencer action routine, which is normal for a frame transmission retry, performs the following discrete actions:

1. Write Next State output to PCB.
2. Write PCB Index to Bus Contend Queue.
3. Return to time line services at start of bus contend this frame cycle.

Text reference 3, in FIG. 23, illustrates the coding for certain Receive Frame Control Fields events. The event is "APERIODIC_BAL". The Next State Output is coded "EXSIGS_WT_RECACK_1" which results in the port staying in the same state (no state transition). The ACK/ECC Out output is coded "SEQE" (Sequence Error). The Action Code output is coded "CLR_BAL/SEND_ACK". This sequencer action routine, which is normal for a rejected BAL frame reception, performs the following discrete actions:

1. Write Next State output to PCB.
2. Save and send ACK/ECC output next frame cycle ACK time.
3. Discard the received BAL frame control field data.
4. Return to time line services and discard the packet data which follows. Send ACK/ECC output next frame cycle ACK time.

Text reference 4, in FIG. 23, illustrates the coding for BIA command events. The specific event is "DISABLE_CMD". The Next State output is coded "OPEND", which is a common end state for ports which have terminated command execution operations. The Status Code output is coded "PC_PORT_BUSY". The Action Code output is coded "WR_PG/ST/TO/CRQ". This sequencer action routine, which is normal for terminating command operations that have a PCB index in the Bus Contend Queue, performs the following discrete actions:

1. Write Next State output to PCB.
2. Write Status Code output to the PCB.
3. Increment Bus Contend Queue Purge Counter in the PCB. (This causes Bus Contend Queue entries for this port to be purged during subsequent bus frame contend period processing by the sequencer.
4. Clear the time out counter in the PCB.
5. Write the port's PCB to the Workstep Dispatch Queue.
6. Return to time line services based upon Timeline Exit Code saved prior to going to the state matrix for event resolution.

As shown in the state matrix source code in FIG. 23, Invalid Event (i.e. unused/reserve event code) (text reference 5), Receive Frame Data Event (text reference 6), and Invalid EGG Location (text reference 7) are all machine check conditions. The are all coded with a Next State output of "OPEND_MACH_CHK" which causes the port to transition to the OPEND Machine Check state. The Status Code output for each of these events is coded to indicate the specific machine check condition. The Action Code Outputs for these events are coded "WR PG/ST/TO/CRQ". This sequencer action routine performs the following discrete actions:

1. Write Next State output to the PCB.
2. Write Status output to the PCB.
3. Increment the Bus Contend Queue Purge Counter in the PCB.
4. Clear the Time Out Counter in the PCB.
5. Write the port's PCB Index to the Workstep Dispatch Queue.
6. Return to time line services based upon Timeline Exit Code saved prior to going to the state matrix for event resolution.

Note that Receive Frame Data events are machine check conditions because they can occur only when the port has received a prior Receive Frame Control Fields event and transitioned to a current state specifically waiting on a Receive Frame Data event. The only way in which these events can be associated to a port in a state waiting on a Receive Frame Ack event is the result of a hardware error.

3.6 Receive Signal Wait on First Receive Signal Frame Control (RSIG_WT_SIC_1) State As shown in the high-level state transition diagram, FIG. 21, this is the initial state in the execution of the common Receive Signal state matrix routine that controls the receive signal portion of the Exchange Signals command operations. In this state (see prior state transition actions in 3.5 above) the port is waiting on the reception of the control fields of a signal frame. FIG. 24 is the State Matrix PROM source code for this state matrix. We will review selected event code entries in this matrix code in the discussion that follows.

The normal event for this state is Signal Frame Control Fields event one such event is shown in the state matrix source code in FIG. 24 (text reference 2). The Next State output for this normal state transition is coded "RSIG_WT_SIGDATA_1", which is the normal state transition and the second state in the common Receive Signals operations. The Status Code output is coded "Non" indicating that no command response status is to be stored in the PCB at this state transition. The ACK Out output is coded "Null" as the Action Code output does not specify a frame ACK/ECC transmission. The Action Code output, which is gated to the sequencer's jump logic is coded "WR_FRCTRL". This sequencer action routine, which is normal for an expected Receive Frame Control fields event, performs the following discrete actions:

1. Write Next State output to PCB.
2. Write received signal frame control field data to the PCB.
3. Return to time line services and subsequent signal frame data to the PCB (Receive Frame Data Buffer Segment of the PCB).

As shown in the state matrix source code in FIG. 24, Receive ACK/ECC events (text reference 1), Invalid event (i.e. unused/reserve event code) (text reference 5), Receive Frame Data Event (text reference 6), and Invalid ECG Location (text reference 7) are all machine check conditions. They are all coded with a Next State output of "OPEND_MACH_CHK" which causes the port to transition to the OPEND Machine Check state. The Status Code output for each of these events is coded to indicate the specific machine check condition. The Action Code Outputs for these events are coded "WR _ST/TO/CRQ". This sequencer action routine performs the following discrete actions:

1. Write Next State output to the PCB.
2. Write Status output to the PCB.
3. Clear the Time Out Counter in the PCB.
4. Write the port's PCB Index to the Workstep Dispatch Queue.
5. Return to time line services based upon Timeline Exit Code saved prior to going to state matrix for event resolution.

Note that Receive Frame ACK/ECC, Receive Frame Control Fields, and Receive Frame Data events are machine check conditions because in the Disabled state the port is not performing I/O operations and its PCB index is not entered in any enabled LPI Memory (e.g. logical frame address association memory). The only way in which these events can be associated to this port/PCB is a result of a hardware error.

The port remains in a busy status while executing the Exchange Signals command. No new BIA command should be issued to this port until it transitions to the OPEND state.

The state matrix source code in FIG. 24 illustrates some command exception conditions. "XMIT_SIG_CMD" event (text reference 3) and "INVALID_CMD" event (text reference 4) (an unused/reserved command code). In both cases, the Next State output is coded "OPEND" which causes the port to terminate command operations. The Status Code outputs are coded "PC_PORT_BUSY" in both cases. The Action Code outputs are coded "WR_STAT/CRQ/ CLTO". This sequencer action routine performs the following discrete actions:

1. Write Next State output to the PCB.
2. Clear the PCB Time Out Counter.
3. Write Status Code output to the PCB.
4. Write the port's PCB Index to the Workstep Dispatch Queue.
5. Return to time line services at the normal point from BIA command event.

3.7 Receive Signal Wait on First Receive Signal Data (RSIG_WT_SIGDATA_1) State

As shown in the high-level state transition diagram, FIG. 21, this is the second state in the normal execution/state transition of the common Receive Signal state matrix routine that controls the receive signal portion of the Exchange Signals command operations. In this state (see prior state transition actions in 3.6 above) the port is waiting on the reception of signal frame data. FIG. 25 is the State Matrix PROM source code for this state matrix. We will review selected event code entries in this matrix code in the discussion that follows.

The normal event for this state is a "GOOD_DATA" event as shown in the state matrix source code in FIG. 25 (text reference 5). The Next State output for this normal state transition is coded "MONSIGS_WT_SIGFR", which is the normal state transition and the normal end of the command operations. The Status Code output is coded "NORMAL_ CMD_END" indicating end of the command operations without any exception conditions. The ACK Out output is coded "GOOD" and will be transmitted the next frame cycle. The Action Code output, which is gated to the sequencer's jump logic is coded "WR_ST/CRQ/SEND_ ACK". This sequencer action routine, which is normal for a commanded operation that terminates with the reception of good frame data, performs the following discrete actions:

1. Write Next State output to PCB.
2. Write Status Code output to the PCB.
3. Save ACK/ECC Out output and send next frame cycle.
4. Clear the Time Out Counter in the PCB.
5. Write the port's PCB Index in the Workstep Dispatch Queue.
6. Return to time line services and send saved ACK/ECC output the next frame cycle.

As shown in the state matrix source code in FIG. 25, Receive ACK/ECC events (text reference 1), Receive Frame Control Fields events (text reference 2), Invalid Events (unused/reserved event codes) (text reference 3), BIA Command events (text reference 4), and Invalid ECG Location event (text reference 7) are all machine check conditions. They are all coded with a Next State output of "OPEND_ MACH_CHK" which causes the port to transition to the OPEND Machine Check state. The Status Code output for each of these events is coded to indicate the specific machine check condition. The Action Code Outputs for these events are coded "WR_ST/TO/CRQ". This sequencer action routine performs the following discrete actions:

1. Write Next State output to the PCB.
2. Write Status output to the PCB.
3. Clear the Time Out Counter in the PCB.
4. Write the port's PCB Index to the Workstep Dispatch Queue.

5. Return to time line services based upon Timeline Exit Code saved prior to going to state matrix for event resolution.

Note that Receive Frame ACK/ECC events, Receive Frame Control Fields events, and BIA Command events are machine check conditions because the prior event that caused the state transition to the current state was a Receive Signal Frame Control Fields event and none of the above events can occur prior to a Receive Frame Data event. The only way in which these events can occur in the current state is a result of a hardware error.

The receive signal frame portion of the Exchange Signals command will perform two retries if bad signal frame data is received as shown in the state matrix source code in FIG. 25 (text reference 6). The "REC_DATA_BAD" event entry's Next State output is coded "RSIG_WAIT_SIG_2". This new state (an associated state matrix code) is similar to "RSIG_WAIT_SIG_1" in 3.6 above. This state transition (see high-level state transition diagram in FIG. 21) causes the procedure to wait on a Receive Signal Frame Control Fields event associated with the retransmission of the signal frame. The ACK/ECC output is coded "RED" (Repeat Error Detected) which is transmitted the following frame cycle. The Action Code output is coded "SEND_ACK". This sequencer action routine performs the following discrete actions:

1. Write Next State output to the PCB.
2. Save ACK/ECC output and send next frame cycle's ACK time.
3. Return to timeline services and send saved ACK/ECC next frame cycle.

SECTION 4—Demonstrated Application Results Summary 4.1 Resource Utilization Efficiency FIG. 26 summarizes the state matrix logic resources required and used to implement the RTCN NIU BIA application. It indicates the resources available, used, and those that remain in reserve. The application required the implementation of 18 BIA I/O port command procedures, a set of control procedures for the special Bus Synch Generator (BSG) port, and a set of control procedures for the Physical Derived LPI (PDL) (e.g. physical node control port). Yet the implementation used only 73 (30%) of the 256 available state matrices in the State Matrix PROM.

The resulting invention provides an improved real-time, event-driven data processor which is more flexible in allowing reconfiguration of event patterns and desired responses, performs a more rapid resolution of control process state transitions and required control actions, and is capable of storing a large repertoire of event patterns and desired responses, with a smaller memory allocation than has been required in the prior art. The invention can be applied to real-time, event-driven data processing in industrial process control, communications switching, distributed data processing, internal combustion engine control, collision detection and avoidance, and many other areas.

Although a specific embodiment of the invention has been disclosed, it will be understood by those having skill in the art that changes can be made to that specific embodiment without departing from the spirit and the scope of the invention.

What is claimed is:

1. A real-time, event-driven data processor having an input connected to a source of event signals and a control output connected to elements to be controlled, comprising:

a state matrix memory having a first input connected to said event input and a second input connected to receive a next state indication and having an output, for storing a plurality of state matrices, each said state matrix selected by a value of the next state indication on said second input corresponding to a control state, and organized into rows and columns with each row corresponding to an event to be detected and each row being divided into members of a first column for the next state, and a second column for the action;

a control sequencer having an input connected to the output of said state matrix memory, for receiving row data from a selected matrix in said matrix memory, in response to said state matrix memory, having received event and next state information on the first and second inputs thereof, said control sequencer in response thereto accessing a sequence of executable instructions;

an arithmetic/logic unit having an input connected to an output of said control sequencer, for receiving said sequence of executable instructions for execution therein, said instructions including a new value for the next state of the system which is output to said second input of said state matrix memory, thereby enabling said state matrix memory to respond to the occurrence of a next event.

2. The apparatus of claim 1 which further comprises an Event Code Generator connected between said event input and said first input of said state matrix memory, for compressing event data to be applied to said first input of said state matrix memory.

3. The apparatus of claim 1, wherein the sequencer establishes and detects events to be presented to the state matrix logic for resolution against current control process state.

4. The apparatus of claim 1, wherein the sequencer instructions and associated source and destination operand addressing capabilities transfer current state and event data to the state matrix logic inputs and initiate state matrix logic operations.

5. The apparatus of claim 1, wherein the sequencer may combine internal status conditions with event data to have state matrix logic resolve both against current control process state.

6. The apparatus of claim 1, wherein the state matrix logic's "Action Code" output is wired directly to the sequencer's jump logic where special "Branch on State Matrix Action Code" instructions operate on same.

7. The apparatus of claim 1, wherein the "Action Code" specifies the required control sequencer response and actions in response to the event to continue or complete the control process cycle.

8. The apparatus of claim 1, wherein the sequencer instructions and associated source and destination operand addressing capabilities transfer state matrix Next State, Status Code, and Frame Acknowledge Code outputs to required destinations such as Transmit Data FIFO or I/O Port Control Blocks.

9. The apparatus of claim 1, wherein the setting of "Function Code" as part of the state matrix logic input process, initiates different event data assemblies off of the internal data bus into the state matrix logic's event input registers.

10. The apparatus of claim 1, wherein the state matrix logic is presented with event data, function code, and current control process state data inputs.

11. The apparatus of claim 1, wherein the function code controls different event data assemblies and reformatting off of the internal data bus.

12. The apparatus of claim 1, wherein the function code activates power to the state matrix logic's PROMs and the last data output from the state matrix PROM deactivates power.

13. The apparatus of claim 1, wherein the state matrix logic is performed by two cascaded PROM operations executed and controlled as a single operation.

14. The apparatus of claim 1, wherein the Event Code Generator (ECG) PROM accepts Function Code and raw event data inputs.

15. The apparatus of claim 1, wherein the ECG PROM also performs error detection and correction operations on any raw event data that includes an ECG.

16. The apparatus of claim 1, wherein the State Matrix PROM accepts Event Code and Current Process State data combined as a single input.

17. The apparatus of claim 1, wherein the State Matrix PROM produces a "Matrix Row" output corresponding to current state and detected event.

18. The apparatus of claim 1, wherein the Action Code output is wired directly to the sequencer's jump logic.

19. A real-time, event-driven data processor having an input connected to a source of event signals and a control output connected to elements to be controlled, comprising:

a state matrix memory having a first input connected to said event input and a second input connected to a current state register and having an output, for storing a plurality of state matrices, each said state matrix corresponding to a control state, and organized into rows and columns with each row corresponding to an event to be detected and each row being divided into members of a first column for the next state, and a second column for the status, a third column for the action, and a fourth column for the acknowledge-out;

a control sequencer having an input connected to the output of said state matrix memory, for receiving row data from a selected matrix in said matrix memory, in response to said state matrix memory, having received event and current state information on the first and second inputs thereof, said control sequencer in response thereto accessing a sequence of executable instructions;

an arithmetic/logic unit having an input connected to an output of said control sequencer, for receiving said sequence of executable instructions for execution therein, and among said instructions is a new value for the current state of the system which is written into said current state register;

said new value stored in said current state register enabling said state matrix memory to respond to the occurence of a next event.

20. The apparatus of claim 19 which further comprises an Event Code Generator connected between said event input and said first input of said state matrix memory, for compressing event data to be applied to said first input of said state matrix memory.

* * * * *